United States Patent
Newhouse

(10) Patent No.: US 10,831,715 B2
(45) Date of Patent: Nov. 10, 2020

(54) SELECTIVE DOWNLOADING OF SHARED CONTENT ITEMS IN A CONSTRAINED SYNCHRONIZATION SYSTEM

(71) Applicant: Dropbox, Inc., San Francisco, CA (US)

(72) Inventor: Benjamin Zeis Newhouse, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 663 days.

(21) Appl. No.: 15/396,060

(22) Filed: Dec. 30, 2016

(65) Prior Publication Data

US 2017/0109370 A1    Apr. 20, 2017

Related U.S. Application Data

(63) Continuation-in-part of application No. 14/982,713, filed on Dec. 29, 2015, now Pat. No. 9,563,638.
(Continued)

(51) Int. Cl.
*G06F 16/178* (2019.01)
*H04L 29/08* (2006.01)
*H04L 29/06* (2006.01)

(52) U.S. Cl.
CPC ........ *G06F 16/178* (2019.01); *H04L 63/1491* (2013.01); *H04L 67/06* (2013.01); *H04L 67/1095* (2013.01); *H04L 67/1097* (2013.01)

(58) Field of Classification Search
CPC .................................................. G06F 16/178
See application file for complete search history.

(56) References Cited

U.S. PATENT DOCUMENTS 7,257,689 B1    8/2007  Baird
7,383,466 B2    6/2008  Kusters et al.
(Continued)

FOREIGN PATENT DOCUMENTS

CN    101288074 A    10/2008
CN    101398850 A    4/2009
(Continued)

OTHER PUBLICATIONS

Australian First Examination Report, Australian Application No. 2017204647, dated Jul. 19, 2017, 3 pages.
(Continued)

*Primary Examiner* — Mark D Featherstone
*Assistant Examiner* — Ranjit P Doraiswamy
(74) *Attorney, Agent, or Firm* — Fenwick & West LLP

(57) ABSTRACT

A content management system synchronizes content items across client computing systems connected by a network. If a storage allocation for shared content items on a client device is exceeded by the request to add or edit a content item such that it is enlarged, a client application or the host of content management system selects content items to remove from residence on the client device but keep remotely on content management system. Upon removal of the selected content items, the client application creates shadow items, representing the content item but only containing the metadata of the content item. This creates sufficient space while maintaining user access to all synchronized shared content items. When a shadow item is requested by an application running on the client device the client application may approve or deny the request based on process or application access date collected from honeypots saved on the client device.

19 Claims, 18 Drawing Sheets

Related U.S. Application Data which is a continuation-in-part of application No. 14/856,246, filed on Sep. 16, 2015, now Pat. No. 9,442,997, which is a continuation of application No. 14/611,116, filed on Jan. 30, 2015, now Pat. No. 9,185,164.

(56) References Cited

U.S. PATENT DOCUMENTS

| | | | |
|---|---|---|---|
| 7,552,044 B2 | 6/2009 | Xu et al. | |
| 7,720,920 B2 | 5/2010 | Singh et al. | |
| 8,019,863 B2 | 9/2011 | Jeide et al. | |
| 8,081,955 B2 | 12/2011 | Davis et al. | |
| 8,200,626 B1 | 6/2012 | Katzer et al. | |
| 8,332,470 B2 | 12/2012 | Arun et al. | |
| 8,352,522 B1* | 1/2013 | Cheng | G06F 21/566 707/827 |
| 8,762,344 B2 | 6/2014 | Esaka | |
| 8,793,573 B2 | 7/2014 | Beckmann et al. | |
| 8,818,941 B2 | 8/2014 | Kiilerich et al. | |
| 8,832,025 B2 | 9/2014 | Arai et al. | |
| 8,862,782 B2 | 10/2014 | Roberts et al. | |
| 8,977,596 B2 | 3/2015 | Montulli et al. | |
| 9,185,164 B1 | 11/2015 | Newhouse | |
| 9,361,349 B1 | 6/2016 | Newhouse | |
| 9,405,767 B2 | 8/2016 | Novak et al. | |
| 9,479,567 B1 | 10/2016 | Koorapati et al. | |
| 9,571,573 B1 | 2/2017 | Koorapati et al. | |
| 9,817,878 B2 | 11/2017 | Newhouse | |
| 9,852,147 B2 | 12/2017 | Von Muhlen et al. | |
| 9,934,241 B2 | 4/2018 | Duval et al. | |
| 9,934,303 B2 | 4/2018 | Newhouse | |
| 10,248,705 B2 | 4/2019 | Newhouse | |
| 2004/0177319 A1 | 9/2004 | Horn | |
| 2006/0100978 A1 | 5/2006 | Heller et al. | |
| 2006/0137010 A1 | 6/2006 | Kramer et al. | |
| 2007/0016621 A1 | 1/2007 | Havewala et al. | |
| 2007/0016754 A1 | 1/2007 | Testardi et al. | |
| 2007/0124374 A1 | 5/2007 | Arun et al. | |
| 2007/0150526 A1 | 6/2007 | D'Souza et al. | |
| 2007/0220220 A1 | 9/2007 | Ziv et al. | |
| 2007/0265935 A1 | 11/2007 | Woycik et al. | |
| 2007/0277010 A1 | 11/2007 | Anand et al. | |
| 2007/0282878 A1 | 12/2007 | Marshall | |
| 2008/0028169 A1 | 1/2008 | Kaplan et al. | |
| 2008/0046670 A1 | 2/2008 | Lam | |
| 2008/0104134 A1 | 5/2008 | Chellappa et al. | |
| 2008/0201362 A1 | 8/2008 | Multer et al. | |
| 2008/0228802 A1 | 9/2008 | Marshall | |
| 2008/0256314 A1 | 10/2008 | Anand et al. | |
| 2008/0263227 A1 | 10/2008 | Roberts et al. | |
| 2009/0157802 A1 | 6/2009 | Kang et al. | |
| 2009/0198805 A1 | 8/2009 | Ben-Shaul et al. | |
| 2010/0161759 A1 | 6/2010 | Brand | |
| 2010/0191783 A1 | 7/2010 | Mason et al. | |
| 2010/0332401 A1 | 12/2010 | Prahlad et al. | |
| 2010/0332456 A1 | 12/2010 | Prahlad et al. | |
| 2010/0332818 A1 | 12/2010 | Prahlad et al. | |
| 2011/0040729 A1 | 2/2011 | Ito et al. | |
| 2011/0078112 A1 | 3/2011 | Takata et al. | |
| 2011/0119668 A1 | 5/2011 | Calder et al. | |
| 2011/0202572 A1 | 8/2011 | Ho et al. | |
| 2012/0016838 A1 | 1/2012 | Arai et al. | |
| 2012/0072397 A1 | 3/2012 | Esaka | |
| 2012/0078942 A1 | 3/2012 | Cai et al. | |
| 2012/0151211 A1* | 6/2012 | Kreiner | H04L 63/102 713/168 |
| 2012/0259813 A1 | 10/2012 | Takata et al. | |
| 2013/0151468 A1 | 6/2013 | Wu et al. | |
| 2013/0226876 A1 | 8/2013 | Gati et al. | |
| 2013/0254660 A1 | 9/2013 | Fujioka | |
| 2013/0305368 A1* | 11/2013 | Ford | G06F 21/568 726/23 |
| 2013/0346557 A1 | 12/2013 | Chang et al. | |
| 2014/0006465 A1 | 1/2014 | Davis et al. | |
| 2014/0040182 A1 | 2/2014 | Gilder et al. | |
| 2014/0188803 A1* | 7/2014 | James | G06F 11/1451 707/638 |
| 2014/0195638 A1 | 7/2014 | Houston et al. | |
| 2014/0229839 A1 | 8/2014 | Lynch et al. | |
| 2014/0289225 A1 | 9/2014 | Chan et al. | |
| 2014/0324776 A1 | 10/2014 | Novak et al. | |
| 2014/0324777 A1 | 10/2014 | Novak et al. | |
| 2014/0330874 A1 | 11/2014 | Novak et al. | |
| 2014/0379647 A1 | 12/2014 | Smith et al. | |
| 2014/0380315 A1 | 12/2014 | Khajuria et al. | |
| 2015/0127679 A1 | 5/2015 | Wing et al. | |
| 2015/0161155 A1 | 6/2015 | Pletcher et al. | |
| 2015/0207844 A1 | 7/2015 | Tataroiu et al. | |
| 2015/0213376 A1 | 7/2015 | Ideses et al. | |
| 2015/0278330 A1 | 10/2015 | Hawa et al. | |
| 2015/0324945 A1 | 11/2015 | Lord et al. | |
| 2015/0373116 A1 | 12/2015 | Mo et al. | |
| 2016/0034490 A1 | 2/2016 | Woo et al. | |
| 2016/0063026 A1 | 3/2016 | Mokhtarzada et al. | |
| 2016/0092444 A1 | 3/2016 | Dornquast et al. | |
| 2016/0350322 A1 | 12/2016 | Fan et al. | |
| 2017/0270136 A1 | 9/2017 | Chen et al. | |

FOREIGN PATENT DOCUMENTS

| | | |
|---|---|---|
| CN | 101689174 A | 3/2010 |
| EP | 1452978 | 9/2004 |
| EP | 2652588 A1 | 10/2013 |
| JP | 2002-140213 A | 5/2002 |
| JP | 2002-244914 A | 8/2002 |
| JP | 2004-054633 A | 2/2004 |
| JP | 2004-227572 A | 8/2004 |
| JP | 2005-505829 A | 2/2005 |
| JP | 2005-228242 A | 8/2005 |
| JP | 2007-140798 | 6/2007 |
| JP | 2007-249782 | 9/2007 |
| JP | 2010-257094 A | 11/2010 |
| JP | 2011-034525 A | 2/2011 |
| JP | 2011-076294 A | 4/2011 |
| JP | 2011-148496 | 8/2011 |
| JP | 2012079043 A | 4/2012 |
| JP | 2013-524358 A | 6/2013 |
| JP | 2014-503086 A | 2/2014 |
| KR | 10-2008-0033264 A | 4/2008 |
| KR | 10-1364356 B1 | 2/2014 |
| WO | WO 03/027882 A1 | 4/2003 |
| WO | WO 2007/011576 A2 | 1/2007 |
| WO | WO 2007/049625 | 5/2007 |
| WO | WO 2008/022328 A2 | 2/2008 |
| WO | WO 2011/148496 A1 | 12/2011 |
| WO | WO 2012/137262 A1 | 10/2012 |
| WO | WO 2013/001332 | 1/2013 |
| WO | WO 2013/121456 A1 | 8/2013 |
| WO | 2016028346 A1 | 2/2016 |

OTHER PUBLICATIONS

Australian First Examination Report, Australian Application No. 2017204654, dated Jul. 19, 2017, 3 pages.
Canadian First Office Action, Canadian Application No. 2,972,706, dated Jul. 25, 2017, 4 pages.
Blakowski, G. et al., "Tool Support for the Synchronization and Presentation of Distributed Multimedia," Butterworth-Heinemann Ltd., Dec. 1992, pp. 611-618, vol. 15, No. 10.
United States Office Action, U.S. Appl. No. 14/856,246, dated Apr. 8, 2016, 5 pages.
PCT Invitation to Pay Additional Fees, PCT Application No. PCT/IB2015/057577, dated Feb. 10, 2017, 5 pages.
PCT Written Opinion of the International Preliminary Examining Authority, PCT Application No. PCT/IB2015/057577, dated Mar. 14, 2017, 18 pages.
PCT International Search Report and Written Opinion, PCT Application No. PCT/IB2016/055254, dated Dec. 9, 2016, 12 pages.
Australian First Examination Report, Australian Application No. 2016381309, dated Apr. 17, 2018, 2 pages.

(56) References Cited

OTHER PUBLICATIONS

Chinese First Office Action, Chinese Application No. 201710635647.5, dated Feb. 11, 2018, 17 pages.
Chinese First Office Action, Chinese Application No. 201580072024.0, dated Mar. 20, 2018, 21 pages.
Chinese First Office Action, Chinese Application No. 201710635654.5, dated Mar. 28, 2018, 18 pages.
Chinese Second Office Action, Chinese Application No. 201710635647.5, dated May 10, 2018, 9 pages.
Japanese Office Action, Japanese Application No. 2017-534702, dated Dec. 19, 2017, 7 pages (with concise explanation of relevance).
Japanese Office Action, Japanese Application No. 2017-162580, dated Dec. 19, 2017, 5 pages (with concise explanation of relevance).
Japanese Office Action, Japanese Application No. 2017-162581, dated Dec. 19, 2017, 5 pages (with concise explanation of relevance).
Japanese Office Action, Japanese Application No. 2017-534702, dated Mar. 26, 2018, 5 pages (with concise explanation of relevance).
Japanese Office Action, Japanese Application No. 2017-162581, dated Mar. 26, 2018, 7 pages (with concise explanation of relevance).
Japanese Office Action, Japanese Application No. 2017-162580, dated Mar. 26, 2018, 7 pages (with concise explanation of relevance).
Korean Office Action, Korean Application No. 10-2017-7017998, dated Mar. 21, 2018, 5 pages (with English summary).
Korean Office Action, Korean Application No. 10-2017-7018190, dated Mar. 28, 2018, 9 pages.
Korean Office Action, Korean Application No. 10-2017-7018184, dated Mar. 28, 2018, 9 pages.
European Extended Search Report, European Application No. 17182635.7, dated Oct. 27, 2017, 8 pages.
European Extended Search Report, European Application No. 17182636.5, dated Oct. 27, 2017, 7 pages.
Canadian Office Action, Canadian Application No. 2,977,692, dated Jun. 15, 2018, 3 pages.
Chinese Third Office Action, Chinese Patent Application No. 201710635647.5, dated Aug. 6, 2018, 20 pages.
European Examination Report, European Application No. 15778056.0, dated Jul. 13, 2018, 8 pages.
PCT International Search Report and Written Opinion, PCT Application No. PCT/IB2015/057577, dated Mar. 14, 2016, 21 pages.
PCT Invitation to Pay Additional Fees, PCT Application No. PCT/IB2015/057577, Dec. 9, 2015, 7 pages.
United States Office Action, U.S. Appl. No. 14/611,115, dated Jun. 5, 2015, 27 pages.
United States Office Action, U.S. Appl. No. 14/611,115, dated Nov. 20, 2015, 21 pages.
United States Office Action, U.S. Appl. No. 15/133,185, dated May 19, 2017, 17 pages.
United States Office Action, U.S. Appl. No. 15/209,672, dated Dec. 6, 2017, 19 pages.
United States Office Action, U.S. Appl. No. 15/209,672, dated Jun. 1, 2018, 18 pages.
United States Office Action, U.S. Appl. No. 15/209,672, dated Sep. 20, 2018, 11 pages.
European Patent Office, Extended European Search Report and Opinion, EP Patent Application No. 19182730.2, dated Nov. 21, 2019, ten pages.
Japanese Patent Office, Decision to Grant a Patent, JP Patent Application No. 2018-516514, dated Dec. 6, 2019, five pages.
United States Corrected Notice of Allowability, U.S. Appl. No. 15/727,567, dated Nov. 4, 2019, two pages.
Decision of Refusal for Japanese Application No. 2018-516514 dated Aug. 13, 2019, 8 pages.
Notice of Allowance from U.S. Appl. No. 15/727,567, dated Oct. 10, 2019, 9 pages.
Notification of Reexamination for Chinese Application No. 201580072024.0 dated Aug. 22, 2019, 18 pages.
Notification of Reexamination for Chinese Application No. 201710635647.5 dated Aug. 28, 2019, 17 pages.
United States Office Action, U.S. Appl. No. 15/727,567, dated Aug. 15, 2019, nine pages.
China National Intellectual Property Administration, Reexamination Decision, CN Patent Application No. 201580072024.0, dated Dec. 25, 2019, 26 pages.
United States Notice of Allowance, U.S. Appl. No. 15/727,567, dated Dec. 27, 2019, two pages.
Communication Pursuant to Article 94(3) for EP Application No. 17182635.7 dated Feb. 17, 2020, 6 pages.
Communication Pursuant to Article 94(3) for EP Application No. 17182636.5 dated Feb. 17, 2020, 6 pages.
Office Action for Korean Patent Application No. 10-2018-7031669 dated Nov. 5, 2019, 4 pages.
Reexamination Decision for Chinese Application No. 201710635647.5 dated Feb. 27, 2020, 19 pages.
Non-Final Office Action from U.S. Appl. No. 16/035,677, dated Jul. 23, 2020, 14 pages.
Extended Search Report for EP Application No. 17167845.1 dated Aug. 22, 2017, 8 pages.
Extended Search Report for EP Application No. 17167846.9 dated Aug. 22, 2017, 8 pages.
International Search Report and Written Opinion for PCT Application No. PCT/IB2017/052326 dated Aug. 22, 2017, 15 pages.
Non-Final Office Action from U.S. Appl. No. 15/420,014, dated Dec. 13, 2019, 47 pages.
Notice of Allowance from U.S. Appl. No. 15/420,014, dated Apr. 16, 2020, 9 pages.
Notice of Allowance from U.S. Appl. No. 15/420,014, dated Jun. 17, 2020, 5 pages.
Office Action for U.S. Appl. No. 15/420,003 dated on Jun. 16, 2017, 6 pages.
Office Action for U.S. Appl. No. 15/420,014 dated on Aug. 7, 2019, 50 pages.
Office Action for U.S. Appl. No. 15/420,014 dated on Feb. 7, 2019, 40 pages.

\* cited by examiner

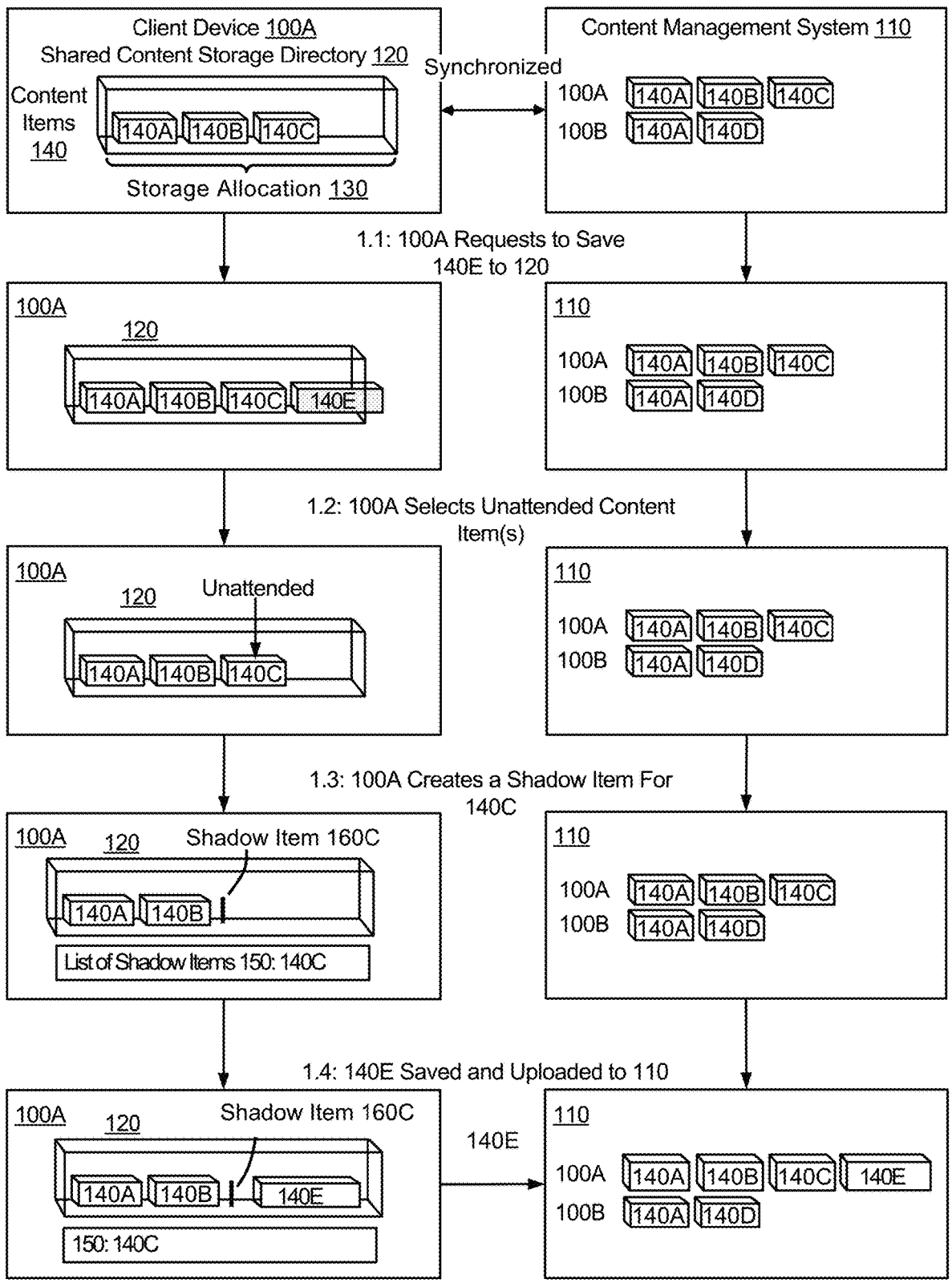

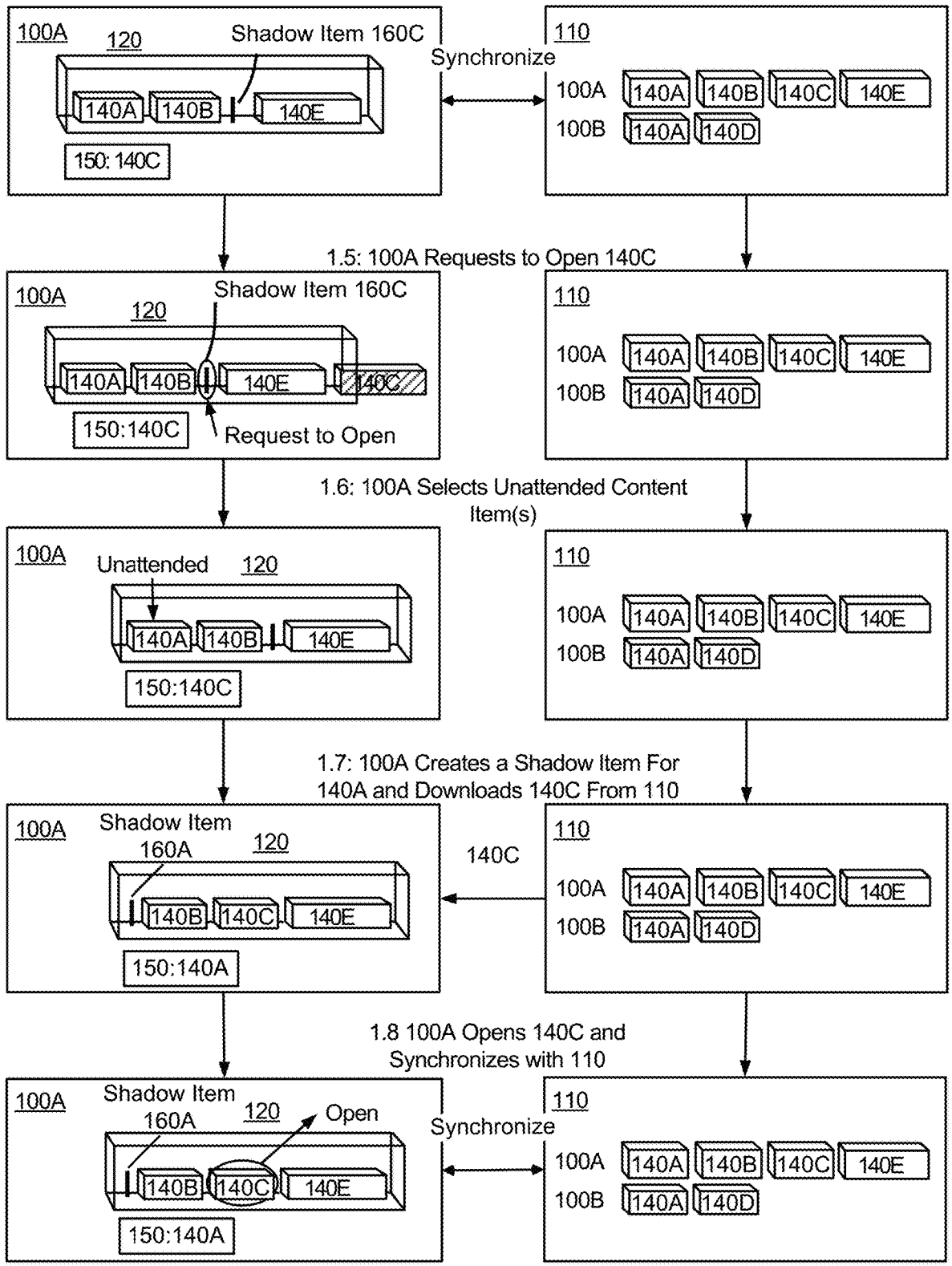

SELECTIVE DOWNLOADING OF SHARED CONTENT ITEMS IN A CONSTRAINED SYNCHRONIZATION SYSTEM

CROSS REFERENCE TO RELATED APPLICATIONS

This application is a continuation-in-part of U.S. application Ser. No. 14/982,713, filed Dec. 29, 2015, now U.S. Pat. No. 9,563,638, which was a continuation-in-part of U.S. application Ser. No. 14/856,246, filed Sep. 16, 2015, now U.S. Pat. No. 9,442,997, which was a continuation of U.S. application Ser. No. 14/611,116 filed Jan. 30, 2015, now U.S. Pat. No. 9,185,164, all of which are incorporated herein by reference in their entirety.

BACKGROUND

The described embodiments relate generally to improving the performance of computer systems providing content item synchronization, and particularly to improving the synchronization of content items between a client device and a content management system where storage allocation for synchronized content items is constrained.

Content management systems enable users to share content items from one client to another client. The clients are computing devices that provide content items to a content management system for storage and synchronization with other clients. The other clients may be operated by another user or may be devices registered or managed by the same user. A user designates which content items or directories containing content items are available to be shared with other users, and thus synchronized to the client devices of such users. Generally, a content management system synchronizes a given content item with all of the client devices that have been designated to share the content item. As a result, each of these client devices may store a very large amount of shared content items. In some cases, the amount of storage taken up on a client device by the shared content items substantially reduces the amount of storage available on the client device for other items, such as unsynchronized content items and applications.

BRIEF DESCRIPTION OF THE DRAWINGS

FIGS. 1A and 1B are concept diagrams that illustrate one embodiment of constrained synchronization.

Figure 2:
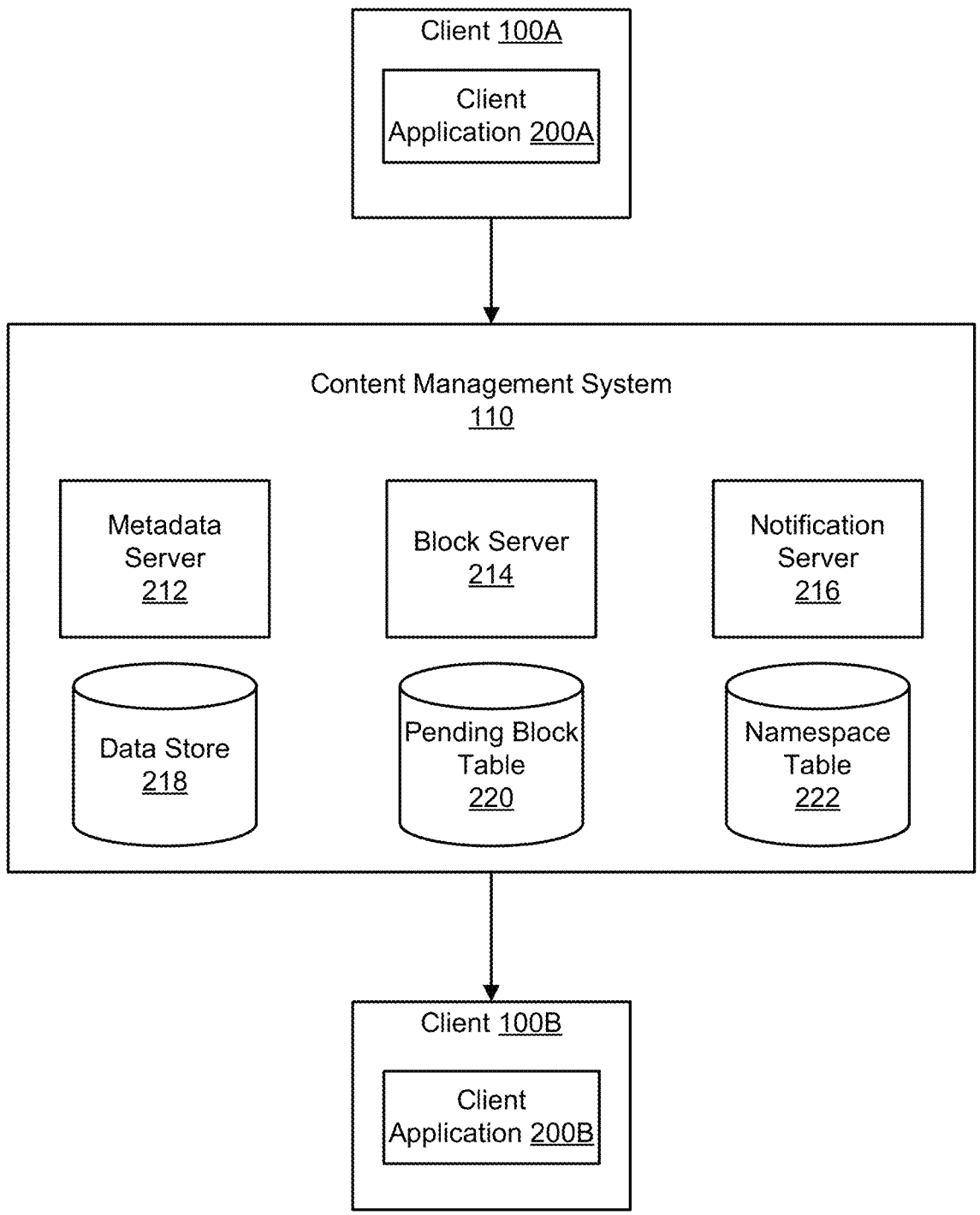
FIG. 2 illustrates a system environment for a content management system that synchronizes content items between client devices.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Functional Overview of Constrained Synchronization

A general functional overview of a constrained synchronization system and process is now described. As a preliminary condition, users store content items on client devices, and the content items are synchronized with instances of the content items on other clients and with a host system, typically a content management system. A client device stores the content items in a local content directory. Content items stored in the local content directory are synchronized with a content management system, which maintains copies of the content items and synchronizes the content items with other client devices. Each client device executes a client application, which enables the user to access the content management system. The client application further enables the user to configure a maximum storage allocation or size for the local content directory.

In one aspect, the client device is configured to selectively determine which synchronized content items remain locally available on the client device, and which are stored in their entirety only on the content management system. In one embodiment, the client device receives a request to access a content item, for example from an application needing access to the content item. The client device determines whether the requested content item is a shadow item or a content item stored locally on the client device. A shadow item is an item that represents or emulates the content item, but does not contain the application data of the content item. Generally, the shadow item replicates the metadata attributes of the content item, such as the name of the content item, as well as various attributes, such as type, path information, access privileges, modification information, and size of the content item, without storing the actual application content, such as text, image data, video data, audio data, database tables, spreadsheet data, graphic data, source or object code, or other types of content data. Because the shadow items only store metadata for the content item, they require only a small amount of storage, e.g., typically about four kilobytes, as compared to a content item that can be hundreds of megabytes or even several gigabytes in size. Thus, using shadow items to represent content items operates to save considerable storage space, thereby improving the functioning of the client device.

Where the client device determines that the requested content item is a shadow item, this indicates that the requested content item content is not at present stored on the client device, but is stored on the content management system. Accordingly, the client device downloads from the content management system the content item that corresponds to the requested shadow item. The client device further determines whether storing the content item in the local content directory would exceed the maximum storage size established for that directory. In that case, the client device determines which content item or items in the local content directory can be removed from the local content directory, and replaced with shadow items that represent the content items. Generally, the client device uses one or more attributes of a shared content item to select content items from the local content directory that have been determined as being unattended by the user of the client device or users with access to the content item via the content management system, including latest access time on the client device (e.g., actions of the user of the client device or applications executing thereon), latest access time on the other client devices with which the content items are shared (e.g., actions of the users of those client devices), content item size, and access frequency. Combinations of these factors may also be used to determine unattended content items. The client device selects a number of content items from the local content directory such that deleting these content items creates a sufficient amount of storage space in the local content directory to allow the downloaded content item to be stored therein without exceeding the maximum storage size. In one embodiment, the client device selects a number of content items so that the total amount of storage used by these content items in the shared content directory at least equals or exceeds the amount of storage required to store the downloaded content item.

The client device deletes the selected content items, and for each deleted content item creates a corresponding shadow item. The client device stores the shadow items in the directory locations corresponding to the deleted content items. Storage of the shadow items in the corresponding locations enables subsequent retrieval of the deleted content items in a manner that is transparent to the requesting applications.

This embodiment provides a constrained shared storage system wherein each client device can maintain access to all content items shared with a content management system while having more space for other content items and applications, and improves the storage efficiency of each client device as well as content management system as a whole. More particularly, the embodiment enables a client device to effectively operate as if it has a significantly larger storage capacity than it does in fact. For example, a client device with only a 10 GB storage allocation for the local content directory can operate as if it had over 4,000 GB (4 TB) of storage allocation for that directory, representing a 400-fold increase in effective storage. In the past, such a solution to limited local storage capacity was made impossible by network connectivity and bandwidth limitations, thus the problem being solved for arises as a result of the recent developments in Internet infrastructure that allows for pervasive connectivity and fast upload and download speeds.

Despite the recent developments in Internet infrastructure, the computational, uploading, and downloading times required for the removal of content items, their replacement with shadow items, and their restoration following a user request may still impact device performance. Therefore, alternative embodiments are also described that reduce impact on device performance as visible to the user while still reducing the storage burden on a client device over traditional shared content synchronization methods. In one embodiment, the computation, uploading, and downloading are completed based upon a predicted a user access to a shared content item represented as a shadow item. To predict a user access to a content item, the client application or the content management system maintains a retention score for each content item; the retention score is a measure of the predicted importance to the user of each content item. Each client device is configured with a retention score threshold such that any content item with a sufficiently high predicted importance (represented by a retention score that exceeds a retention score threshold) is downloaded to the corresponding client device. The retention score may be calculated based on a variety of attributes including latest access time, location, type, size, access frequency, shared status, number of accounts with access, number of devices with access, or number of devices storing the content item.

Alternatively, another embodiment allows the storage space occupied by shared content items on a client device to exceed the storage allocation while the activity of the client device is monitored (either by the content management system or by the client application). When a client device is determined as being idle, the client application removes the content items and replaces them with shadow items, as previously discussed, in order to reduce the effective storage space occupied by the content items stored on the client device. In these embodiments, the storage allocation is not maintained at all times and so occupied storage can be reduced according to other content item attributes. Instead of maintaining a storage allocation, for example, all content items with a latest access date older than a specified amount of time (e.g., two weeks) could be removed and replaced with shadow items whenever the client device is idle. This process does not keep the occupied storage space below a storage allocation but would reduce it in a way that might be preferable to the user since the operations are done while the client device is idle and thus not being actively used by the user, thereby improving a client device configured to use a constrained synchronization system by offering a user experience improvement over the previously described embodiments while providing a similar increase in effective storage capacity.

FIGS. 1A and 1B are concept diagrams that further illustrate embodiments of constrained synchronization. FIG. 1A illustrates a process of saving a content item in a storage constrained synchronized folder. FIG. 1B illustrates a process of opening a shadow item on a storage constrained client device.

In FIGS. 1A and 1B, client device 100A is one of a plurality of user controlled devices that can be connected and synchronized with content management system 110. Content management system 110 is a server instantiated to synchronize content from a plurality of client devices using a network. A shared content storage directory 120 is a directory located on the client device 100 that contains content synchronized with content management system 110. A storage allocation 130 is a parameter value that specifies an amount of storage space allowed for all content items in the shared content storage directory 120. The storage allocation 130 can be set by the user of the client device 100A, the operating system of the client device 100, a client application of content management system 110, by a system administrator, or by policies established at content management system 110. An example value for the storage allocation 130 is 10 GB; this means that the user can store up to 10 GB of content items in their entirety (all content item attributes and data) in the shared content storage directory 120. Content items 140 are saved within the shared content storage directory 120; after synchronization between a client device 100 and content management system 110 a version of each content item 140 in the shared content storage directory 120 is also maintained by content management system 110.

The term "content item", as used herein indicates any file, group of files, or collection of files. Any content item that consists of only a single file may alternatively be referred to as a file. Additionally, terms such as "file table" may be used to refer to both individual files or content items.

In FIG. 1 the shared content storage directory 120 is graphically depicted as a box that contains the content items 140. The storage allocation 130 is represented by the particular length of the box representing the content storage directory 120.

The first illustration of the client device 100A and content management system 110 represents a typical state of the two entities. The client device has content items 140A, 140B, and 140C stored within its shared content storage directory 120 (only a small number of content items 140 are shown for the purpose of explanation, as in practice the number of content items 140 can be in the thousands, tens of thousands, or more). Content management system 110 is represented as being synchronized with client device 100A and so it maintains an identical version of each of the content items stored on the client device 100A though it does not have a storage allocation 130. Additionally, content management system 110 supports another client device 100B, with which the content item 140A is shared. The presence of content item 140D in association with the identification of client device 100B indicates that client device 100B is also synchronizing this content item 140D with content management system 110. Thus, each client device 100 can synchronize content items 140 with only content management system 110 or with content management system 110 and other client devices 100.

Stage 1.1 illustrates the operation of a request from client device 100A to save content item 140E to the shared content storage directory 120. However, as illustrated, the addition of content item 140E to the shared content storage directory 120 would cause the total storage space occupied by the content items 140 to exceed the storage allocation 130, since the size of content item 140E exceeds the remaining available space in the shared content directory 120 as limited by the storage allocation 130.

Stage 1.2 illustrates the operation of the selection of an unattended content item 140C to be removed from the client device 100, so as to make available sufficient storage in which content item 140E can be stored. Depending on the embodiment, either the client device 100 or content management system 110 determines which content items 140 to select as being unattended. A variety of methods, discussed below can be used to determine which content items are selected as unattended. While only a single content item 140C is selected in this example, in practice any number of content items 140 may be selected, depending on the amount of storage capacity that needs to be made available.

Stage 1.3 illustrates the operation of removing the selected content item 140C from the client device 100A. In place of each removed content item, the client device 100A creates a shadow item 160C that represents the removed content item 140C, and stores the shadow item in the same location in the shared content storage directory 120 as the removed content item 140C. Alternatively, the content management system 110 may create the shadow item 160C and then download the shadow file 160C to the content storage directory 120. The shadow item includes attributes that represent the removed content item 140C, such as the content name, path information, content attributes, and content size, but without containing the actual data of the content item 140C. By not including the actual data of their corresponding content items, shadow items require considerably less storage. For example, a shadow item typically requires no more than the smallest file size allocation provided by the operating system, such as 4 KB. This small size is illustrated visually in FIG. 1 using a vertical line, showing that the size of the shadow item is negligible when compared to the content item 140C itself. For example, while the removed content item 140C may be many megabytes or even gigabytes in size (very common for audio or video files), the storage required for a shadow item representing such a content item would still be only 4 KB or so. As a result, the client device 100 is able to reduce the amount of local storage used for shared content items to an amount below the storage allocation 130, and thereby make available sufficient space to store the newly created (or updated such that the new version of the content item is larger) content item 140E. Information identifying the selected (and removed) content items is maintained on the client device 100A, to allow these items to be selectively retrieved at a later time. This information is stored locally in client device 100 in a list 150 of stored content items that are remotely stored in remote content item table 366 (as further described below, not illustrated in FIG. 1A) in content management system 110.

Stage 1.4 illustrates the operation of saving content item 140E to the client device 100A once sufficient space has been made available in the shared content storage directory 120. Once the client device 100A successfully saves the content item 140E to the shared storage directory 120, synchronization with content management system 110 is initiated and content item 140E is uploaded to content management system 110. Content management system 110 still maintains full copies of all content items (including shadow items) on client device 100A.

Referring now to FIG. 1B, client device 100A and content management system 110 are shown after content item 140E has been synchronized between the client device 100A to the client management system 110.

Stage 1.5 illustrates the operation of client device 100A requesting access to content item 140C (e.g., open content item 140C using a word processor, or show the content item in a file browser), wherein client device 100 determines that the requested content item is represented by a shadow item. If the content item is stored locally, it is provided to the requesting application on the client device 100A. In this case the requested content item has been removed from the client device 100A and is only stored remotely on content management system 110, so the client device 100 requests content management system 110 to download the requested content item. If there is sufficient space on the shared content storage directory 120, content management system 110 downloads the requested content item to the client device 100A; the client then replaces the shadow item 160C that represented content item 140C with content item 140C itself, which allows any requesting application to access the content item transparently. However, in this case, the addition of content item 140C to the shared content storage directory 120 would exceed the storage allocation 130, as depicted by content item 140C extending outside the boundaries of the shared content storage directory 120.

Stage 1.6 illustrates the operation of selecting unattended content item(s) for removal from the client device 100A. In this case, the unattended content item selected is content item 140A.

Stage 1.7 illustrates the operation of removing content item 140A and replacing it with its shadow item 160A. This removal creates enough space in shared content storage directory 120 for content item 140C to be downloaded from content management system 110 and appended to its shadow item representation without exceeding the storage allocation 130. The removed content item 140A is included in the list 150 of remotely stored content items, and content item 140C is removed from this list 150, since it has been restored to the shared content directory 120.

Stage 1.8 illustrates that once content item 140C is resident on client device 100A it can be opened by the requesting application. Once the processes illustrated by FIGS. 1A and 1B on client device 100A have been completed, normal synchronization can occur between client device 100A and content management system 110 such that all changes to content items 140 on client device 100A are mirrored on content management system 110. All content items 140 (even if represented by shadow items) are maintained on content management system 110 until they are deleted from the shared content storage directory 120.

Overview of System Architecture

FIG. 2 illustrates the system architecture of a constrained synchronization system. Details about each component will be further described in a later section, however some elements are introduced here to provide context for the explanation of constrained synchronization. Further, as is apparent to those of skill in the art, the operations and methods used in constrained synchronization necessarily require a computer, and are not performed in any embodiment by mental steps by a human operator. Further, while the operations may make use of the facilitates of a computer to store and retrieve information, transmit and send information, or process information, those of skill in the art appreciate that such operations are not simply generic computer operations since they are herein performed in specific manners on specifically defined data using the algorithms described herein, and thus require configuration of a computer in a manner different from how such computers are provisioned natively by their operating system and standard applications alone. Additionally, the required configuration enhances the storage capacity of the computer, through the steps detailed below, over generic, general purposes computers configured with conventional operating systems and file management systems.

Client devices 100 communicate with content management system 110 through a network, not shown, which can be any suitable communication means providing internetworking between client devices 100 located remotely from content management system 110; e.g., a LAN, WAN, or WAN. In general, client device 100A with a client application 200A installed provides content items to content management system 110. The client application 200A contains the programs and protocols necessary for client device 100A to perform the functions associated with storage constrained synchronization. Therefore, client device 100A often performs actions requested by the client application 200A. However because client device 100A and client application 200A act together, for ease of description some of these actions are referred to using "client device 100A" as the operative element. The user of client device 100A has designated certain of the content items to be shared with client device 100B, which for example, can be another computer managed by the same user, or a computer operated by a different user. Content management system 110 notifies client device 100B and synchronizes the designated content items received from client device 100A with local content stored at client device 100B.

Content management system 110 associates each content item with a namespace corresponding to a set of content items. A namespace designates a directory (or "folder") in a directory structure into which the given content items are stored. The association of content items with particular namespaces is stored in a namespace table 222. Content management system 110 associates each client with the namespaces (and content items therein) to which it has access, along with an identification of the specific rights to access, modify, and delete the content items in each namespace. When clients 100 are synchronized to a namespace, the clients store a local copy of content items associated with the namespace and organize the content items according to content location, if available. A user may be associated with an individual client device 100 or with multiple clients 100; for example, a user may have a home computer, a work computer, a portable computer, a smartphone, and tablet computer all synchronized together. To share content items, a user designates a namespace to be shared with other users and/or clients. Content management system 110 then synchronizes the content items in the shared namespace(s) across the clients 100 associated with the shared namespace. The content items stored at content management system 110 can include any type of content item, including documents, data, movies, applications, code, images, music, and so forth. The content item may also be a folder or other mechanism of grouping content items together, such as a collection, playlist, album, file archive, and so forth.

Each user is associated with an account on content management system 110 that includes information specifying an amount of storage to be used for storing content items on content management system 110. A client device also has a designated amount of local storage for storing the synchronized content items, which is the size of the shared content storage directory 120; this designated amount is the storage allocation parameter 130 described above. For example a user's account may specify that the user has 50 GB of storage available on content management system 110, but has a storage allocation on the client device 100 of only 10 GB. In circumstances such as this, when the user modifies a shared content item that is stored locally, the content item may increase in size, and thereby exceed the storage allocation on the client device 100. Similarly, the user may exceed the storage allocation on the client device 100 by creating and storing in the shared content directory 120 a new content item to be shared and synchronized with content management system 110. In these cases, the amount of shared content items exceeds the storage allocation for the client device 100, in which event the client device 100 is storage constrained and can no longer maintain a local copy of all content items synchronized by content management system 110.

Either the client device 100 or content management system 110 is configured to select one or more content items to remove from the local storage while still maintaining them remotely on content management system 110, so that they can be subsequently retrieved and restored to the client device 100. Generally, the content items that are selected are those that are least recently accessed, either on the particular client device 100 on which the request to access the content item is made, or across all client devices 100 on which the content items are shared; other methods of selections are discussed further in a following section. In a client-based embodiment, the client application 200 maintains information identifying the latest access for each shared content item stored on the client device 100. When storage is constrained, the client application 200 selects one or more of the content items that have been least recently accessed (herein, "LRA"). In a host-based embodiment, content management system 110 maintains the access data for every content item; the system 110 updates this information anytime a content item is accessed on any client device 100 with which the content item is shared. LRA selection is only one of a number of possible unattended content item selection methods (herein "UCSM") each of which can be implemented as either a host-based or client-based system. Any UCSM may consult the vnode reference for the each content item to determine whether it is eligible for removal. The vnode for each content item contains information regarding a number of accesses to the content item as well as other content item status indicators including whether or not the content item is currently in use or open.

For succinctness, whenever content items are selected for removal from residency on a client device 100 in response to a storage constraint, the operation is referred to herein as "selecting the unattended content items," since most of the UCSM operate to identify those content items that are least likely to be accessed by the user. Unattended content item refers to content items selected by any UCSM outlined in the following discussion.

Basic LRA Selection: To perform basic LRA selection, the client application 200 maintains a queue of content items ordered by latest local access date with the least recently accessed content item at the top of the queue. The latest access date and time for each content item is maintained in a content access history table. An access to a content item includes the actions of creating, opening, previewing, or modifying a content item. Any number of these actions can be deemed an access, for example, an embodiment might deem an access to be either opening, modifying, or saving a content item but previewing a content item may not be deemed an access. A cumulative sum (e.g., running total) of the storage size is calculated for each content item listed in the queue starting with the least recently accessed content item identified in the queue (i.e., the content item at the top of the queue), and ending with the content item at the end of queue. When storage is constrained, the client application 200 determines an amount of storage space required to store a content item, and so progresses through the queue to identify the index of the content item for which the cumulative storage size exceeds the storage space requirement. The identified index is used to select all content items above and including that index in the queue for removal from the shared content storage directory 120 on the client device 100.

These processes are further explained in Table 1. In this example, 75 MB of storage are required to store a content item. Because content items A and B only total 70 MB, removal of these two content items does not provide a sufficient amount of storage for the item. Accordingly, content items A, B, and C, which have a total cumulative size of 150 MB are selected (as indicated by the designation in the rightmost column), at corresponding indices 00, 01, and 02.

TABLE 1

| Index | Item Name | Local Access Time | Item Size | Cumulative size | Selected? |
|---|---|---|---|---|---|
| 00 | Item A | 1/3/2014 4:33 PM | 10 MB | 10 MB | Yes |
| 01 | Item B | 3/24/2014 5:12 PM | 50 MB | 60 MB | Yes |
| 02 | Item C | 3/24/2014 6:18 PM | 20 MB | 80 MB | Yes |
| 03 | Item D | 3/30/2014 6:22 PM | 80 MB | 160 MB | No |
| 04 | Item E | 5/18/2014 7:53 AM | 20 MB | 180 MB | No |

Remote LRA Selection: LRA selection can also be based on remote accesses by other users that have access to the content items through content management system 110, either directly thereon, or on client devices 100 which have shared versions of the content items. To accomplish this, in one embodiment, each client device 100 synchronizes its own content access history table with content management system 110, for example, during normal content item synchronization operations, or at other times. This embodiment enables each client device 100 to maintain current access information for every content item that it shares with any other client device. Alternatively, for a host based embodiment, content management system 110 may maintain a content access history table that contains the access history for each content item across all client devices that are designated for synchronization and sharing, so that it has a currently updated list to use for LRA selection. Remote LRA selection then includes the content management system 110 selecting the least recently accessed content items whose cumulative storage size exceeds the required storage space. In this embodiment, this queue is ordered by latest access times from all client devices that are synchronized with respect to the content item.

Table 2 is an example of how remote LRA may be implemented. In this example, Content items B and C were last accessed remotely on a different client device on May 24, 2014 and Apr. 5, 2014 respectively but were both last accessed locally on Mar. 24, 2014 (as listed in Table 1). This change in latest access date for Items B and C, due to their remote accesses, moves them farther down in the queue compared to when basic LRA selection is used. As a result, in this example, Items A and D are selected instead of A, B and C.

TABLE 2

| Index | Item Name | Last Access Time Across all Sharing Clients | Item Size | Cumulative Sum | Selected? |
|---|---|---|---|---|---|
| 00 | Item A | 1/3/2014 4:33 PM | 10 MB | 10 MB | Yes |
| 01 | Item D | 3/30/2014 6:22 PM | 80 MB | 90 MB | Yes |
| 02 | Item C | 4/5/2014 5:57 PM | 20 MB | 110 MB | No |
| 03 | Item E | 5/18/2014 7:53 AM | 20 MB | 130 MB | No |
| 04 | Item B | 5/24/2014 5:12 PM | 50 MB | 180 MB | No |

Content item Size Selection: Another factor that may be used to select content items for removal is their size. In one embodiment, size is used to minimize the number of content items that are removed and stored remotely from the client device 100. This can be accomplished by ordering the queue by size (smallest to largest) instead of by access date. Then the required storage space value could be compared to the individual sizes until a content item having a size that exceeds the required storage space is identified. The client application 200 would then select this content item for removal. If no single content item is larger than the required storage space then the largest content item would be selected and its size subtracted from the required storage space value and the process would be repeated from the beginning of the queue.

Table 3 is an example of this selection method. For this example, 40 MB of storage are required to store a content item. Item B is the first content item by queue index that exceeds the required storage value of 40 MB and so it is selected for removal from client 100.

TABLE 3

| Index | Item Name | Access Time | Item Size | Selected? |
|---|---|---|---|---|
| 00 | Item A | 1/3/2014 4:33 PM | 10 MB | No |
| 01 | Item C | 3/24/2014 6:18 PM | 20 MB | No |
| 02 | Item E | 5/18/2014 7:53 AM | 20 MB | No |
| 03 | Item B | 3/24/2014 5:12 PM | 50 MB | Yes |
| 04 | Item D | 3/30/2014 6:22 PM | 80 MB | No |

Content item Size and Access Time Based Selection: The size selection method just described may sometimes select frequently accessed content items for removal. By taking both size and access time into account the content management system can avoid removing content items from a client device 100 that may be requested by the user in the near future. In one embodiment, this dual-variable selection method is accomplished by calculating a weighted score for each content item, based on the amount of storage each content item contributes to reaching the required storage allocation and its last access date. For example $$Score = w_1 S + w_2 A$$

where S is a metric representing the content item size, A is a metric representing the time since the last access to the content item, and $w_1$ and $w_2$ are the weights. The weights for A and S can based on their relative importance, as determined by the user, by a system administrator, or the based on historical content item access patterns for content items on the particular client device 100. The queue is then be ordered by Score and the first content item in the queue is selected for removal.

An example implementation of this selection method is illustrated in Table 4 below. For the purposes of this simple example, the access time metric A is the ratio of the difference between the current time and the latest access for the particular content item and the difference between the present time and least recently accessed item access (in this case the date used was Sep. 3, 2014). In this example, size metric is the relationship:

$$\text{For } s \geq r: S = r/s$$

$$\text{For } s < r: S = s^2/r^2$$

where s is the content item size, r is the required storage space, and S is the size metric. This piecewise function has a maximum of 1 when s=r.

In the example displayed in Table 4, the required storage space is 40 MB and the weights $w_1$ and $w_2$ are both 1. The size metric and the access time metric are calculated and then used to calculate the total Score, for each content item. In this example, Item B has the highest score and so is selected for removal from the client device 100. If the content item selected has a size smaller than the required storage space, a new required storage space is calculated as the difference between the old required storage space and the size of the first selected content item, the score is recalculated and a new queue is generated for all content items using the newly calculated required storage space, and the selection process is repeated.

TABLE 4

| Index | Item Name | Access Time | Access Time Score | Item Size | Item Size Score | Total Score | Selected? |
|---|---|---|---|---|---|---|---|
| 00 | Item B | 3/24/2014 5:12 PM | 0.67 | 50 MB | 0.8 | 1.47 | Yes |
| 01 | Item D | 3/30/2014 6:22 PM | 0.65 | 80 MB | 0.5 | 1.15 | No |
| 02 | Item A | 1/3/2014 4:33 PM | 1 | 10 MB | 0.06 | 1.06 | No |
| 03 | Item C | 3/24/2014 6:18 PM | 0.67 | 20 MB | 0.25 | 0.92 | No |
| 04 | Item E | 5/18/2014 7:53 AM | 0.44 | 20 MB | 0.25 | 0.69 | No |

Access Frequency and Recency Selection: In order to better select unattended content items, other factors such as frequency can be considered in addition to access time. High frequency-low recency content items are content items that have been frequently selected sometime in the past (e.g., more than 6 months ago) but not recently; low frequency-low recency content items are content items that have never been frequently accessed. Frequency of access can be measured relative to an average frequency on a particular client device, or across any population of client devices, or by type, name space, source domain, or other content item attributes. For example, if a content item has not been accessed on a client device in the last four months but had been accessed 25 times before that time it is likely to be more relevant to the user than a content item of similar recency that was accessed only once in the past.

In one embodiment, the number of accesses for each content item is maintained (at either client device 100 or content management system 110) in addition to the latest access to each content item. A score is determined for each content item as a weighted combination of metrics representing eachvariable. For example, a weighted score for each content item, based on a metric for access frequency of a content item and its last access date. For example $$Score = w_1 F + w_2 A$$

where F is a metric representing the access frequency, A is a metric representing the time since the last access to the content item, and $w_1$ and $w_2$ are the weights. The weights for A and F can based on their relative importance, as determined by the user, by a system administrator, or the based on historical content item access patterns for content items on the particular client device 100. The queue is then be ordered by score. A cumulative sum is calculated at each index and is compared to the required storage space. When the required storage space is exceeded by the cumulative sum the index and all content items above that index in the queue are selected for removal from the client device 100.

Table 5 illustrates one example of this selection method. In this example, the required storage space is 40 MB and the weights $w_1$ and $w_2$ are both 1. The queue is ordered by the total score and the cumulative sum is compared to the required storage space. This results in the Item C and E being selected for removal from client device 100.

FIG. 2. The following describes one of a number of possible methods of synchronization that may be used with storage constrained synchronization.

Content management system 110 stores content items in data store 218. Content items are stored in fixed size portions termed a block. The size of a block varies according to the implementation, and in one embodiment, the blocks are 4 megabytes in size. Thus, a small content item is stored as a single block, while a large content item may be split up into dozens, hundreds, or more blocks for storage at content management system 110. The metadata includes a blocklist that defines the blocks in the content item and an ordering of the blocks in the content item.

Pending block table 220 maintains a list of pending blocks expected to be received at content management system. Pending block table 220 stores an association between blocks (identified by block identifiers) and the namespaces to which the blocks belong that clients 100 indicate will be transmitted.

Namespace table 222 stores data associating individual content items with namespaces and maintains data associating each namespace with clients.

Metadata server 212 is responsible for managing a request from the client to add ("commit") a new content item to content management system 110. Metadata server 212 also receives requests to synchronize content items from client device 100. Metadata server 212 maintains a record of the

TABLE 5

| Idx | Item Name | Access Time | Access Time Score | Access Count | Access Number Score | Total Score | Item Size | Cum. Sum | Selected? |
|---|---|---|---|---|---|---|---|---|---|
| 00 | Item C | 3/24/2014 6:18 PM | 0.67 | 50 | 0.83 | 1.50 | 20 MB | 20 MB | Yes |
| 01 | Item E | 5/18/2014 7:53 AM | 0.44 | 60 | 1 | 1.44 | 80 MB | 100 MB | Yes |
| 02 | Item A | 1/3/2014 4:33 PM | 1 | 14 | 0.23 | 1.23 | 10 MB | 110 MB | No |
| 03 | Item D | 3/30/2014 6:22 PM | 0.65 | 32 | 0.53 | 1.18 | 20 MB | 130 MB | No |
| 04 | Item B | 3/24/2014 5:12 PM | 0.67 | 26 | 0.43 | 1.10 | 50 MB | 180 MB | No |

Any of the above UCSM may consider entire folders within a single queue index instead of only individual files. For example, if the LRA UCSM is being used and a folder contains a plurality of files, where the most recently accessed file within the folder has an earlier access date than all other content items in the shared content directory it may be more efficient to select the entire folder as unattended (especially if significant storage space is required). Alternatively, the combined metric for the folder, could be an average, median, or other statistic that generalizes the content items within the folder allowing it to be placed into the queue.

In the following description, any of the foregoing methods may be used to select unattended content items for removal from a client device 100. This process of selecting unattended content items enables the enhanced storage capabilities on the client device, as provided by the constrained content management system 100.

Overview of Content Management System

The method of synchronization using content management system 110 between client devices 100A and 100B can be explained with reference to the architecture illustrated by last time that client device 100 synchronized with content management system 110. When a request is received from client device 100 to synchronize, metadata server 212 determines any content items that have been committed to namespaces synchronized to that client device 100 since the last synchronization time stamp. In addition, metadata server 212 determines any pending blocks that have been received since the last synchronization time stamp.

Notification server 216 is responsible for communicating with clients 100, and particularly with notifying clients that new data is available. The notification server 216 maintains a list of clients 110 associated with each namespace at namespace table 222. When the notification server 216 receives an alert from block server 214 or metadata server 212 that a new block is available for a given namespace, notification server 216 identifies clients associated with the namespace from namespace table 212. Notification server 216 notifies client(s) 100 associated with the namespace to wake client(s) 100 and indicates that new blocks are available for the identified namespace.

A typical synchronization between two clients 100, client device 100A and client device 100B occurs as follows. First, client device 100A adds an additional content item to the shared data. The additional content item is then transmitted to content management system 110. Content management system 110 notifies client device 100B that the additional content item is in the shared data, and client device 100B retrieves the additional content item from content management system 110 as client device 100B. Content management system 110 maintains a list of content items and pending blocks that are expected to be received at content management system 110 using a pending block table 220, and notifies client device 100B to download blocks corresponding to a content item as blocks are received by content management system 110. Pending blocks are those blocks that correspond to a content item that content management system 110 expects to receive and are used to identify blocks that may be provided to receiving client device 100B prior to a content item being committed to content management system 110.

To manage in-transit content items, content management system 110 retains a list of pending blocks along with the namespace associated with the pending blocks. When a pending block is received, clients associated with the namespace are notified and can initiate a transfer for the received block. Thus, uploading clients (providing a new content item) and downloading clients (receiving the new content item) may asynchronously transfer blocks to content management system 110.

Overview of Client Device

Each client device 100 is a computing device, such as a desktop, laptop, tablet, mobile device, or other system that maintains a local copy of shared data synchronized with content management system 110 and with other clients using the installed client application 200. The shared data may be synchronized only with clients associated with a single user, or may be synchronized to clients associated with multiple users. Client device 100 includes modules and applications for manipulating and adding data to the shared data, as further described with respect to FIG. 3.

Figure 3:
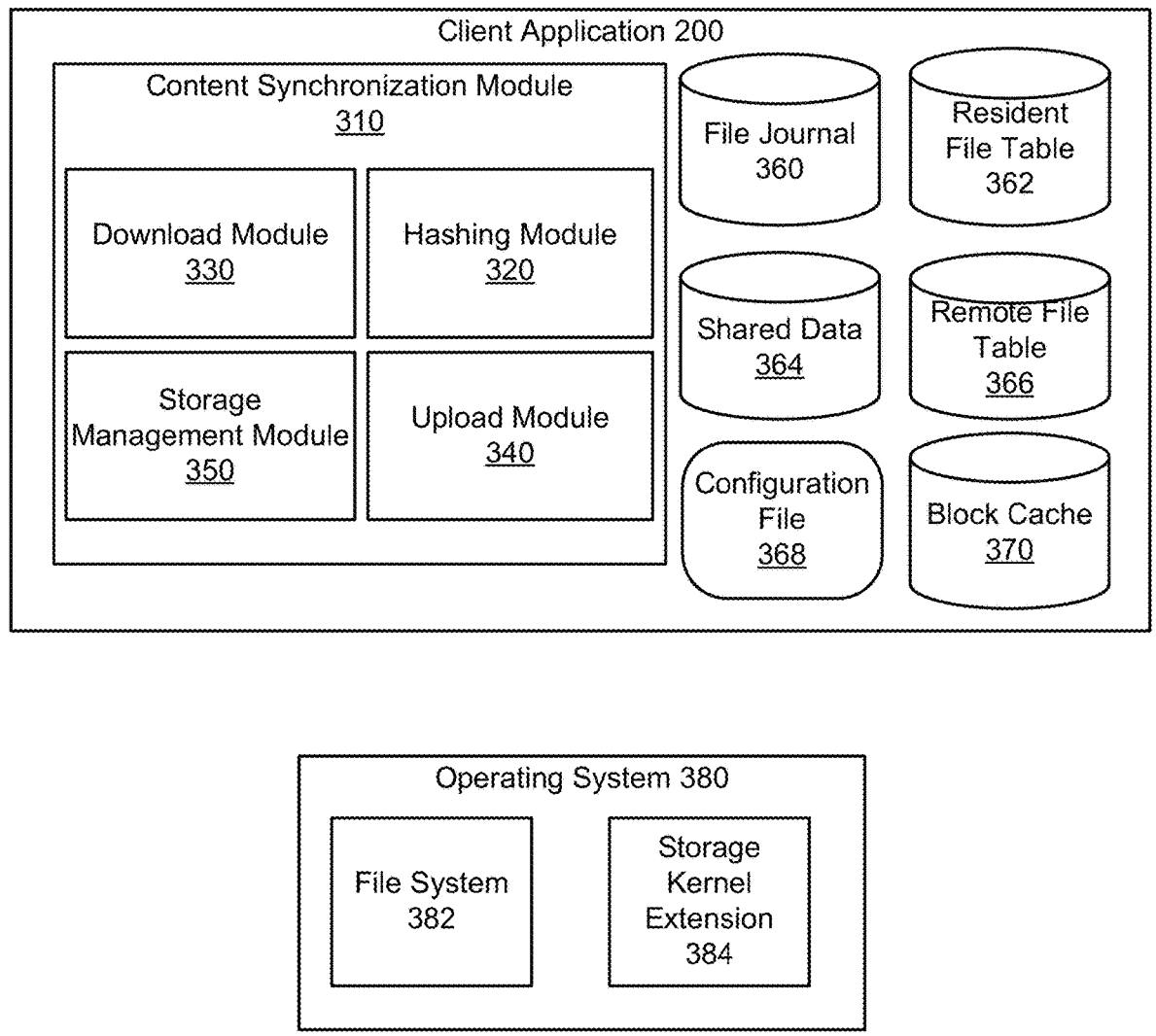
FIG. 3 illustrates the software architecture of a client device.

FIG. 3 shows modules of client application 200. Client application 200 includes various modules and data stores for synchronizing data with content management system 110. Client application 200 includes content synchronization module 310, hashing module 320, download module 330, upload module 340, and storage management module 350. Additionally, the client application 200 maintains data stores including a file journal 360, a resident file table 362, shared data 364, a remote file table 366, a configuration file 368, and a block cache 370. In addition to client application 200, FIG. 3 also indicates the storage kernel extension 384 present on the operating system of the client device. The configuration of client application 200 and its associated kernel extension using these modules instantiates client application 200 as a particular computer able to perform the functions described herein, which enables the described improvements in the storage capacity and functional performance of the client device.

Shared data 364 are data that has been synchronized with content management system 110, and includes content items received from content management system 110. When users add, modify, or delete content items in shared data 364, those changes are synchronized with content management system 110. The hashing module 320 and the block cache 370 work to identify blocks that comprise content items being uploaded to content management system 110. The hashing module assigns a block identifier by performing any suitable hashing algorithm, such as MD5 or SHA-1. Content synchronization module 310 then uses these identifiers to compare the resident blocks located in the block cache 370 with the blocks maintained by content management system 110. These modules are present in the current embodiment but this block implementation is not required for the invention of storage constrained synchronization.

When data is modified or added to the shared data 364 on the client device 100 within the client application 200, the modifications to the shared data 364 are transmitted to content management system 110. Client device 100 is also configured to receive notifications from content management system 110. When the client device 100 receives a notification, client device 100 queries content management system 110 for modifications to shared data 364. When the shared data is modified, the client device 100 requests the modifications from content management system 110 to store shared data on client device 100. In some cases, the modified data may be associated with a content item represented by a shadow item. In this case, the client device 100 may withhold the request for modified data from content management system 110 until access to the content item represented by the shadow item is requested by an application on the client device 100. Alternatively, when a shared content item is modified by another client device 100, content management system 110 may request that the constrained client device 100 restore the content item represented by a shadow item such that the modification can be synchronized at the expense of other content items resident on the constrained client.

Within the client application 200, the file journal 360 stores a table listing metadata for all content items accessible to the account using the client application 200. Metadata includes revision date and time, namespace, and blocklists corresponding to each content item. Content items that are not resident or not synchronized are still included in the file journal 360.

The resident file table 362 stores a list of files that are always kept resident on the client device 100, without regard to storage constraints.

The remote file table 366 stores a list of files that have been selected to be deleted from the client device and replaced with shadow items. These files are only maintained by content management system 110 and possibly other users with access to the file.

The configuration file 368 is a file maintained by the client application 200 and contains the storage allocation 120 for the client device. In some embodiments the storage allocation 120 can be created by the user or computer systems that may have control over the client application 200. For example an operating system may change the storage allocation 120 so that it can maintain a sufficient amount of storage for use by other applications.

The storage kernel extension 384 is configured to monitor requests from applications to the operating system 380 for access to content items, and determine whether or not the requested content items are shadow items, and is one means for performing this function. The storage kernel extension 384 constitutes a direct modification to the structure and function of the operating system that enable the increase in the effective storage capacity on the client device.

The kernel extension 384 monitors requests made to open content items managed by the client application 200. The kernel extension 384 determines when requests are made to open content items managed by the client application 200 by monitoring the file system 382 on the operating system 380. When a request for a content item is made within the file system 382, the kernel extension 384 examines the pathname of the content item to determine whether it is within the content items stored within the shared content storage directory 120.

The kernel extension 384 determines whether the requested content item is a shadow item by determining whether its size is under a threshold size. Alternatively, identification of a shadow item can be completed based upon extended file attributes for content items managed by the client application 200. A file attribute indicating a shadow item could be assigned to shadow items such that the kernel extension could identify a shadow item without examining the requested content item's size. If the file is determined to be a shadow item by the kernel extension 384, the kernel extension communicates the identification information to the client application 200.

Figure 4:
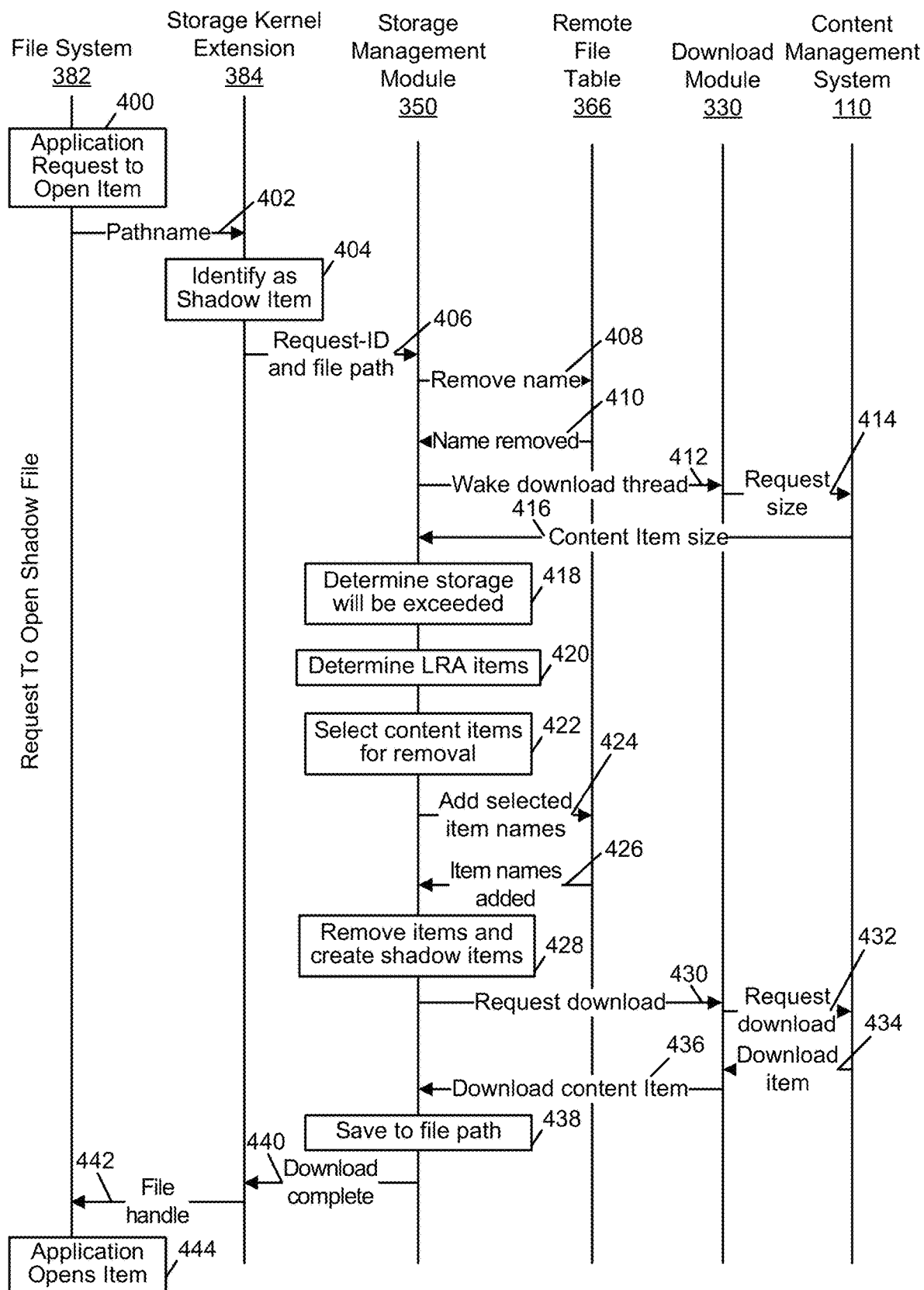
FIG. 4 is an interaction diagram of constrained synchronization for accessing an existing content item in the local content directory.

FIG. 4 is an interaction diagram showing one embodiment of a process for accessing a content item not resident on the client device 100 but included in the file system as if the content item was resident on the client device 100. The file system 382 receives 400 a request to open a content item within a synchronized folder on the client device 100. The request may come from any application, such as a file explorer, word processor, document reader, image editor, or the like. The storage kernel extension 384 intercepts 402 such file system requests, and obtains the pathname of the requested content item. The storage kernel extension 384 uses the pathname to determine 404 whether the content item is a shadow item. The storage kernel extension 384 may do this by checking the size of the requested content item to determine if it is below a predetermined threshold, or otherwise consistent with the size of shadow item (4 KB). Alternatively, the storage kernel extension 384 can read a file attribute extension that stores a value indicating whether content item is a shadow item or a regular content item. If the content item is not a shadow item, then then the storage kernel extension 384 allows the request to continue as normal and gives the file handle to the file system so that the content item can be opened.

Upon determining that the content item is a shadow item, the storage kernel extension 384 sends 406 the request identification number (information about the request including the request type) and the file path to the storage management module 350, passing in the file name. The storage management system 350 removes 408 the file name from the remote file table 366. The storage management system 350 then wakes 412 the download thread, which checks content items that require synchronization from content management system 110. As the requested content item has been removed from the remote file table 408, the download thread can now request 414 content item information from content management system 110, including the size of the requested content item in preparation for the download. The storage management module 350 receives 416 the size information from content management system 110, and determines 418 whether storing the content item on the client device 100 will cause the predetermined storage limit to be exceeded. If the storage limit will be exceeded by the addition of the requested content item, the storage management module 350 selects 422 one or more content items stored on the client device 100 for removal. However, if the storage limit will not be exceeded, the storage management module 350 proceeds to download 430 the content item.

In the case that the storage allocation 130 will be exceeded by the addition of the requested content item to the shared content storage directory 120, the storage management module 350 selects one or more content items to remove, so as to make available sufficient storage space for the requested content item before requesting a download 430 thereby preventing the shared content directory from ever occupying greater than it's allocated space. The storage management module 350 selects 422 content items for deletion by first determining 420 the unattended content items, using any of the UCSM described above. Where the access history of particular content items or other information pertaining to each selection method are stored on the host system, a request is made to the host system (not shown in FIG. 4) to update the client application's 300 version of this information. Once the current version of the access history or any other required information for each content item in content management system 110 has been obtained, the storage management module 350 can determine 420 the unattended content items.

The storage management module then selects 422 unattended content items for removal from the client device. In this embodiment, to select 422 content items to remove, the storage management module 350 traverses the queue generated by the UCSM in use to create storage space at least as large as the size of the requested content item to be downloaded. The selection of the unattended content items for removal can be conducted using any of the methods described above.

Figure 8:
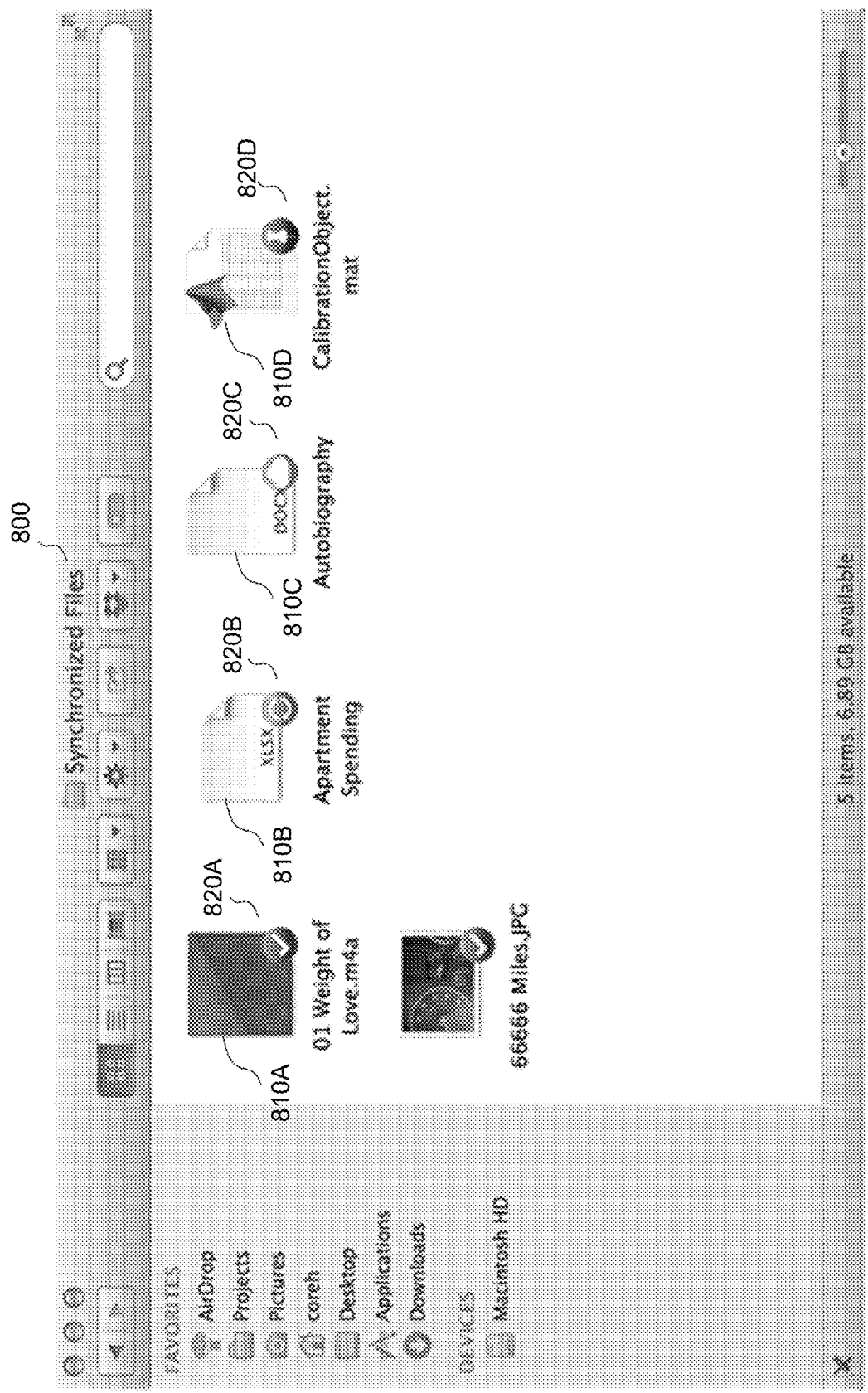
FIG. 8 is an illustration of a user interface for a local content directory with icons representing remote and local content items.

The storage management module 350 then adds 424 the names of the selected content items to the remote file table 366. Once this addition 424 has been confirmed 426, the storage management module 350 removes 428 the selected content items from shared content storage directory 120 on client device, and then creates, for each removed content item, a corresponding shadow item that has the same metadata and location as the removed content item, but does not contain the content information for the content item. Shadow items may be represented in the user interface of the client as if they are still resident on the client device 100. FIG. 8 illustrates an example of how shadow items may be represented in the user interface of the client device 100.

Upon removal of the selected content items, there will be sufficient storage space on the client device 100, and the requested content item can be downloaded from content management system 110 without exceeding the storage limit for the shared content storage directory 120. Accordingly, the storage management module 350 sends a download request 430 to the download module 330. The download module 330 then initiates a download 432 with content management system 110. Once the content item is downloaded 434 to the download module 330 it is passed 436 to the storage management module 350, which saves 438 the requested content item to the previously identified location and notifies 440 the storage kernel extension 384 that the download is complete. In one embodiment, the storage management module 350 appends the contents of the downloaded content item to the shadow item metadata, and updates the content item attributes to indicate that content item is now no longer a shadow item. This enables the requesting application to transparently access the requested content item, using the same file handle and identification information it used to initially request access to the content item. The storage kernel extension 384 then passes through the file handle 442 to the file system 382, which gives the requesting application permission to open the content item 444.

Figure 5:
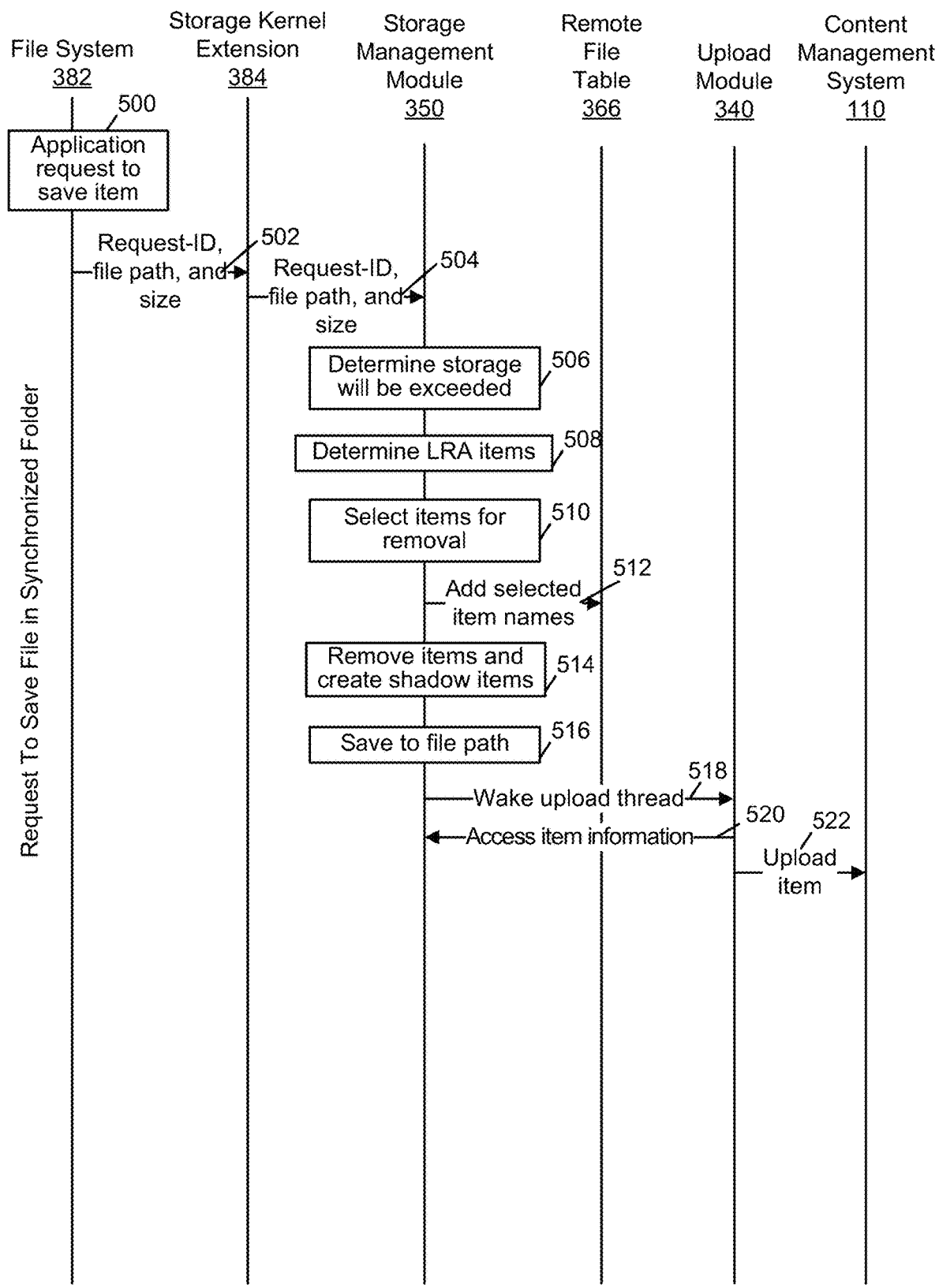
FIG. 5 is an interaction diagram of constrained synchronization for creating a new content item to be stored in the local content directory.

FIG. 5 is an interaction diagram showing one embodiment of a process of saving a content item to shared content storage directory 120 that is approaching its storage allocation 130. The content item can be a newly created content item in the shared content storage directory 120, a content item that has been relocated into the shared content storage directory 120, or a content item that was already in the shared content storage directory 120, and then modified in such a way to increase its size. The process begins with an application making a request 500 to the operating system's file system 382 to save a content item within the synchronized folder. The storage kernel extension 384 monitors this request and receives 502 the request-ID, file path, and size from the file system. The storage kernel extension 384 then sends 504 this information to the storage management module 350. The storage management module determines 506 whether the addition of the new content item will cause the synchronized folder to exceed its storage limit. If the storage limit will not be exceeded, the file system 382 is allowed to save the content item as normal. In the case that the storage limit will be exceeded, the storage management module 350 determines 508 the unattended content items and selects them for removal from the client device. Once the unattended content items are selected their names are added 512 to the remote file table 366 so that their content will not be synchronized by content management system 110. The storage management module then removes the selected content items from the client device 100 and replaces 514 them with shadow items, which have the same metadata and location as the removed content items but contain no content. When this process is complete there is sufficient storage space in the constrained folder for the storage management module to allow 516 the original content item to be saved. The storage management module then wakes 518 the upload thread, which accesses 520 the metadata so that the contents of the saved content item are uploaded 522 to content management system 110.

In addition to automatically removing content items and creating shadow items, some embodiments also allow for the user to select particular content items to be stored only remotely on content management system 110. This may be implemented by simply allowing the user to select from a context menu (e.g., "right-click") on a particular synchronized content item. The client application 200 would then present the user with an option to make the selected content item remote. If the user choses this option the content item is removed from the client device 100, the name of the content item is added to the remote file table 366, and a shadow item with the same metadata and location of the original content item is created to represent the original content. If the user wants to access the content item in the future the same process described in FIG. 5 may be used to retrieve the content item from content management system 100.

In some embodiments, the client device is configured to enable the user to select particular content items to remain resident on the client device when the storage allocation 130 is reached regardless whether the UCSM in effect would otherwise select them for removal from the client device 100. This embodiment offers operational improvements that allow the user to maintain quick access to particularly important content items. In this embodiment, the client application 200 enables the user to access a context menu, and then select an option to force a content item to remain resident on the client device 100. Upon selecting, the name of the content item is added to the resident file table 362. The resident file table 362 is subsequently accessed during the UCSM used by the storage management module 350 shown in 422 and all content items in the table are excluded from the selection process. For example, when a given content item is selected for removal, the resident file table 362 is examined to determine if the selected content item is listed therein; if so, the selected content item is ignored, and another content item is selected by the UCSM in effect.

Because the content associated with shadow items on a client device 100 is not being synchronized it may make content management more complicated. For example, if a user on one client device moves a content item that is represented as a shadow item on a second client device then, if the second client device is not receiving synchronizing data regarding the shadow item, its location may change on the first client device but not on the other. For example, a content item may be deleted from content management system 110 completely by one client device 100 while represented by a shadow item on a different client device 100. If this situation occurred the user of the second client device 100 may try to access the content item represented by shadow item only to find that it no longer existed. To avoid these confusing circumstances, in some embodiments, the content management system 110 is configured to synchronize shadow items for metadata only; that is, if any of the attributes of a shadow item change, content management system 110 will synchronize the modified attributes to all client devices 100 with access to that content item regardless of whether the content item is represented as a shadow item on any of those client devices. Thus, if a content item is deleted from one client device, the shadow item representing that content item is deleted as well on any other client device 100. Alternatively in some embodiments, if a content item is modified on another client device such that its size changes so it can fit within the remaining storage in the shared content storage directory 120 on a client device 100 it may be downloaded to the client device 100 even if access to the content item is not requested.

Figure 6:
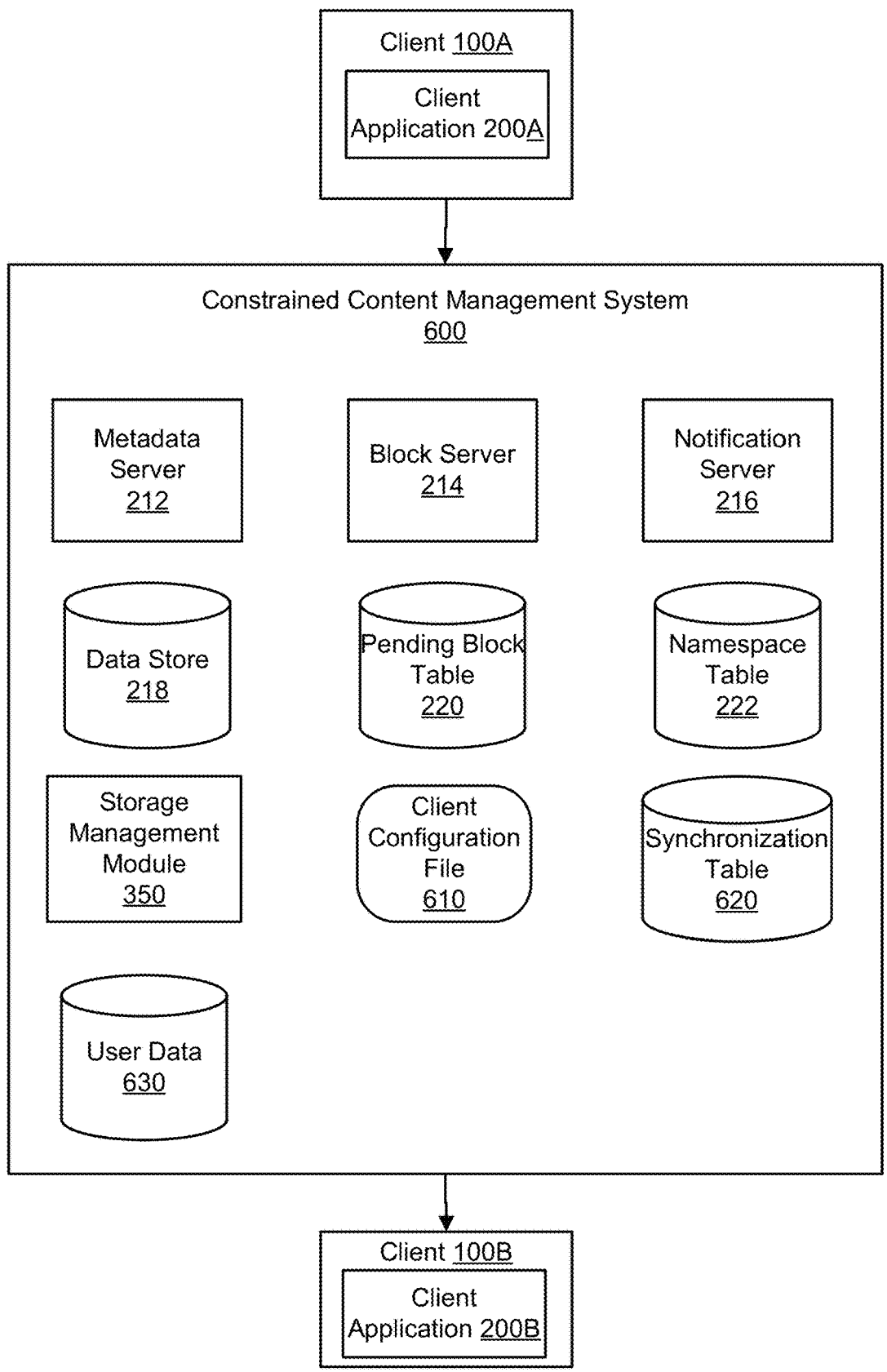
FIG. 6 illustrates a system environment for host based constrained synchronization.

Some of the foregoing embodiments represent client-based constrained synchronization systems as the client application 200 is responsible for ensuring that the predetermined storage allocation 130 is not exceeded and for requesting data from the content management system 110. In a host-based embodiment, illustrated in FIG. 6, content management system 110 manages the constrained synchronization process, including maintaining information identifying the remote and resident content item information for each client device 100. A host-based embodiment may provide the same benefits of increasing effective storage capacity on a client device 100, while reducing the computation needed from the client device, thereby improving client device 100 performance in comparison to other embodiments. The constrained content management system 600 includes elements of content management system 110 shown in FIG. 2, further modified to utilize the storage management module 350 along with the necessary data files required for the storage management module 350 to function properly. Within the constrained content management system the metadata server 212, block server 214, notification server 216, data store 218, pending block table 220, and namespace table 222 function in the same manner as implemented in content management system 110. Additionally, storage management module 350 functions in a manner similar to when it is resident on the client device, where it is responsible for determining when the storage space limit will be exceeded and appropriately creating shadow items. The storage management module 350 is also responsible for receiving information from the client device 100 about requests made by the operating system 380. When a request is made to open one or more content items information about the request is sent to the content management system 110 to be monitored remotely by the storage management module 350 so that the required downloads are made to provide access to shadow items on the client device 100. The storage management module 350 uses the client configuration file 610 to provide information regarding the storage configurations on each client device associated with the constrained content management system. The synchronization table 620 is a record of all content items on client devices that require synchronization with the constrained content management system 600; the content items included in this table would be a subset of the content items located in the data store 218 since some of the content items are shadow items and require only metadata synchronization. Further, in this embodiment, the synchronization table 620 may be replaced by using both a resident file table 362 and a remote file table 366 configured such that they indicate the client devices 100 on which each content item should be kept remote or resident. For an embodiment using the latter configuration, implementation of metadata synchronization for shadow items is easier as the shadow items are identified directly in the remote file table 366 of each client device 100. User data 630 is stored on the constrained content management system 600 so that the storage management module 350 can determine the unattended content items.

Figure 7:
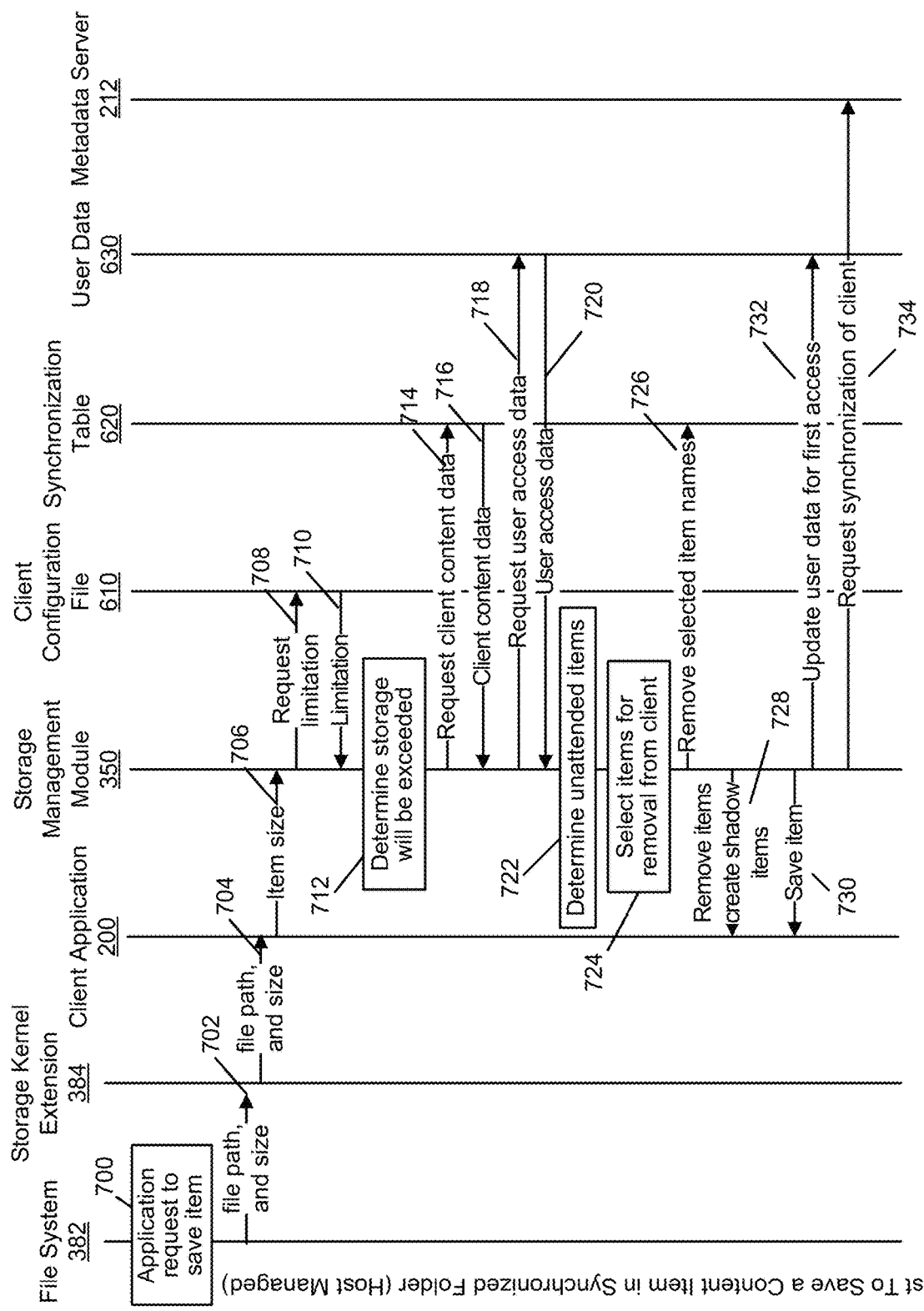
FIG. 7 is an interaction diagram of constrained synchronization managed by a host device.

FIG. 7 is an interaction diagram illustrating one embodiment of a process of a host managed constrained storage synchronization. An application on a client device requests 700 for a content item to be saved to the synchronized folders on the client device. The storage kernel extension records 702 the request ID, file path, and content item size and transfers 704 the information to the client application 200. The client application 200 forwards 706 the content item size information to the storage management module 350 on the constrained content management system 600. The storage management module 350 requests 708 the storage limitation for the particular client from which it received 706 the content item size information from the client configuration file 610. The storage management module 350 determines 712 that the storage limit will be exceeded by comparing the size in addition to the other content items resident on client device 100 to the storage allocation received from the client configuration file 610. The storage management module 350 requests 714 the content data on the client from the synchronization table 620 so that it may select content items to remove from the client from the synchronized content items on the client. The synchronization table responds 716 with the synchronized content data for the particular client. The storage management module 350 requests 718 user access data from user data 630 stored on a host device to use to determine LRA content items. Once this data is received 820 from the user data table 630. The storage management module 350 can determine 722 the LRA content items and select 724 those that should be removed from the client to provide the required storage space. The storage management module 350 sends requests to remove content items and create shadow items 728 to the client application 200. It gives 730 permission to the client application 200 to complete the original request 700 to save a content item. Finally the storage management module updates 732 the user data to reflect the first content item access for the saved content item and then requests 734 synchronization of the client device 100 from the metadata server 212 since a new content item is available for upload.

FIG. 8 illustrates an example a user interface of client device 100 operating in coordination with a content management system providing constrained synchronization. A synchronized files folder 800 serves as the shared content storage directory 120. Folder 800 contains a number of content items, each represented by a corresponded icon 810A, a .m4a music file, 810B, a .xlsx spreadsheet, 810C, a .docx word processing file, 810D, a .mat Matlab file, and 810E, a .jpg image file. Each icon 810 is overlaid with a status icon 820 that indicates the storage status of the content item.

Status icon 820A ("check icon") indicates that the content item is currently resident on the client device 100 and is synchronized with the current version of the content item maintained by content management system 110.

Status icon 820B indicates that the content item will be resident on the client device 100 once synchronization with content management system 110 is complete.

Status icon 820C indicates that the content item is a shadow item and is not currently resident on the client device but still maintained on content management system 110.

Status icon 820D indicates that the content item is resident on the client device and synchronized with its version maintained by content management system 110. Additionally, the green circle with the pin icon 840 indicates that the content item has been chosen to remain resident on the client device 800 during a storage constraint.

Figure 9:
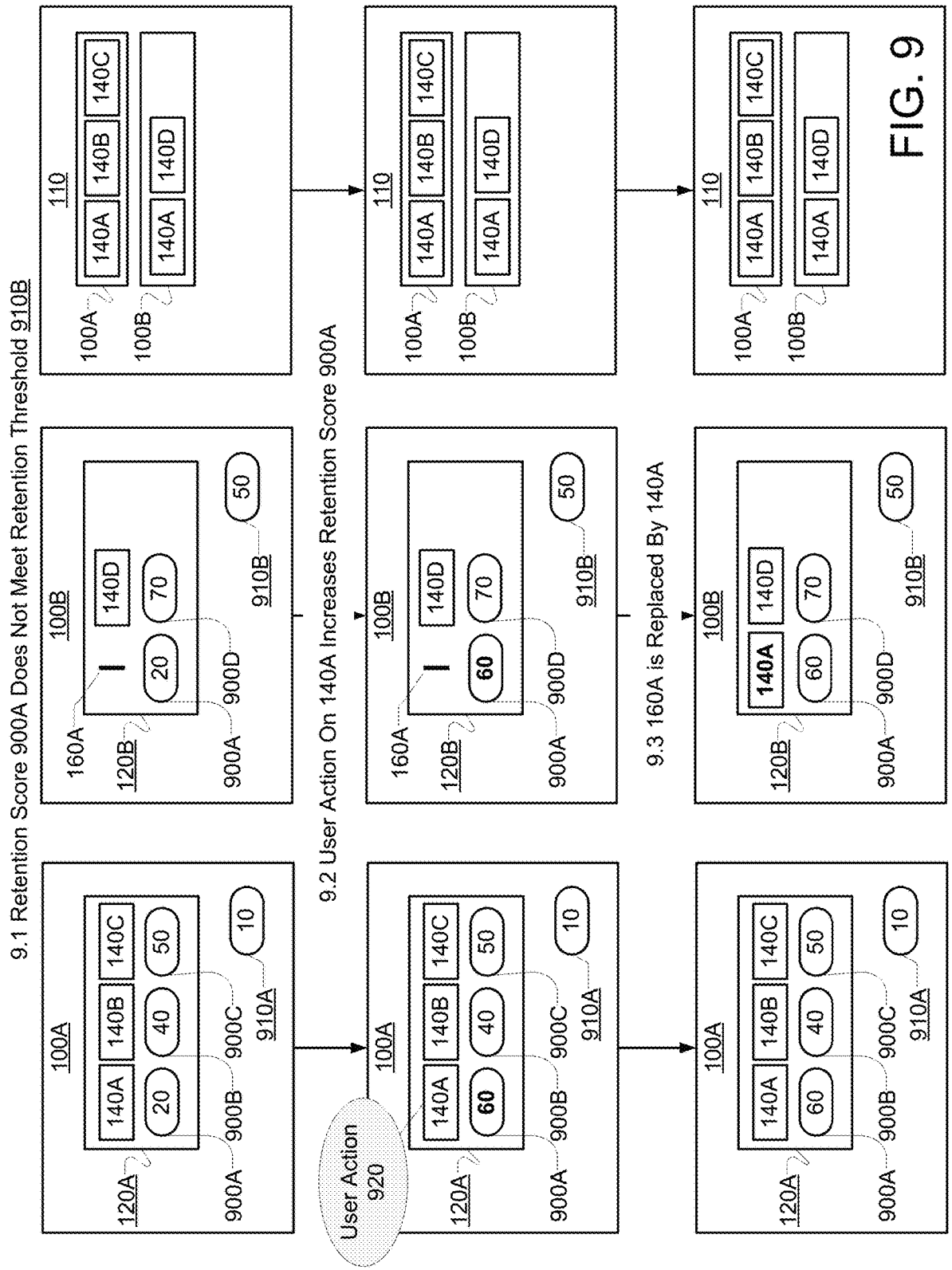
FIG. 9 is a concept diagram illustrating constrained synchronization using predicted content item importance.

FIG. 9 is a concept diagram illustrating an alternate embodiment of constrained synchronization, which predicts user access to particular content items remote to a client device, and downloads the predicted content items in advance of the access. This approach offers a further improvement in the operation of the client device by eliminating in most cases the time a user may have to wait to retrieve the content item over the network from content management system 110. A retention score 900 is calculated for each content item 140 within a shared content storage directory 120. This score is a measure of the predicted importance of a content item and can be calculated as a function of latest access time, or a number of other factors determined to be predictive of a user request, as explained in a later section. Additionally, each content storage directory 120 is configured with a retention score threshold 910, which may be specified by the user or set at a predetermined value. Whenever the predicted importance of a content item, as measured by the retention score 900 of the same content item, exceeds the retention score threshold 910 of a particular shared content storage directory 120 on a client device 100 with access to the content item, the content item is downloaded to the shared content storage directory when it is remote to the client device and maintained within the shared content directory if it is resident on the client device.

Stage 9.1 illustrates a typical state of a content management system, which predicts user access to content items. In this illustration, content management system 110 manages two client devices 100A and 100B. Shared content storage directories 120A and 120B are located within their respective client devices. Shared content storage directory 120A stores content items 140A, 140B, and 140C while shared content storage directory 120B stores content item 140D and a shadow item representation 160A of content item 140A. Synchronized versions of all content items 140 are stored on content management system 110.

Additionally, each content item 140 has a corresponding retention score 900, where 900A is the retention score for content item 140A, 900B is the retention score for content item 140B and so forth. Each shared content storage directory is also configured with a retention score threshold 910, where 910A is the retention score threshold for shared content storage directory 120A and 910B is the retention score threshold for shared content storage directory 120B.

In stage 9.1, content item 140A is not maintained in shared content storage directory 120B. Though in this case there are no content items resident within a shared content storage directory 120 that have a retention score 900 lower than the retention score threshold 910, this scenario is possible if traits from other embodiments, described previously or in a following section, are used in addition to those from this embodiment. For example a storage allocation may still be in affect and so if the storage allocation is sufficiently large it may not be necessary to keep a file remote even if it has a retention score 900 lower than the retention score threshold 910.

In stage 9.2, a user of client device 100A performs a user action 920 on content item 140A that is considered an access to content item 140A. Because, in this example, retention scores 900 are calculated as a function of latest access time, the retention score 900A of content item 140A increases from 20 to 60 (The magnitude of this change is arbitrary for the purpose of this example. Details on retention score calculation are provided later and may not result in the same score change).

In stage 9.3, the content management system 110 or, in some embodiments, the client application on client 100B, determines that the retention score 900A of content item 140A is greater than or equal to the retention score threshold 910B of the shared content storage directory 120B where content item 140A is remote. Because the retention score 900A exceeds the retention score threshold 910B, the content item 140A is downloaded to client device 100B and stored in shared content storage directory 120B.

Similar to the UCSMs there are a number of retention score calculation methods. Generally retention scores can be normalized against user behavioral attributes, resulting in retention scores for the same content item that are different for each client device, or global so that scores are the same for each client device. The advantage of normalized retention scores is that they level out differences in user behavior. For example, if the retention score is a function of the latest access time of a content item where the score increases as the time between the present time and the latest access time decreases, a more active user would drive up the retention scores of content items shared with that user when compared to content items shared with a less active user. If the retention scores are not normalized for a third user, sharing with both the active user and the less active user, the retention scores would lose their predictive quality as only the items from the active user would have the highest retention scores even though a recent access by the active user is less predictive of an access by the third user than is a recent access by the less active user. Whenever a retention score is normalized it can be normalized to an attribute of a particular user or a particular content item.

The following methods are examples of methods for determining a retention score, or a score predicting a user access of a content item. Additionally, a retention score may use a combination of the following methods to create the most predictive measure of predicted importance. Typically the retention score increases as the predicted importance of a content item increases, however the opposite can be true if convenient for an embodiment. In this case the corresponding retention score threshold would be a minimum value where if the retention score of content item was less than or equal to the retention score threshold it would be downloaded to the corresponding shared content storage directory. For the purposes of this discussion the default case of an increasing retention score will be assumed.

Latest Access Scoring: For latest access scoring the retention score of a content item is a function of the latest access time of that content item. The retention score could simply be the inverse of the difference between the current time and the latest access time in seconds:

$$RS=1/(t_C-t_A)$$

where RS is the retention score, $t_C$ is the current time, and $t_A$ is the latest access time.

If normalization is needed for the particular embodiment a variety of user attributes may be used such as a user's or client device's access frequency defined as the number of accesses of any shared content item by a particular user or on a particular client device within a predetermined time period. Alternatively, the average latest access time of content items shared with a particular user or client device may be used.

Access Frequency Scoring: For access frequency scoring, the retention score of a content item increases with an increase in the number of accesses to the same content item within a predetermined time period. To normalize access frequency scoring the access frequency for a given content item could be divided or otherwise scaled by the average access frequency for all content items on a client device or shared with a user.

Location Related Access Scoring: For location related access scoring, the retention score of a first content item is a weighted combination of the latest access time, access frequency, or any other characteristic of the content item itself and the same characteristic of additional content items stored in the same folder as the first content item. This implies that accesses to content items within a folder are predictive of accesses to other content items within the same folder.

Similar Access Scoring: For similar access scoring, the retention score of a first content item is a weighted combination of the latest access time, access frequency of the content item itself and the same characteristic of additional content items with similar attributes as the first content item. Attributes may include content item type, size, location, users with access to the content item, etc. This implies that accesses to similar content items are predictive of future accesses to a content item.

Criteria Based Retention Scoring: For criteria based retention scoring, the retention score of a content item is based on the number of previously identified predictive criteria satisfied by the content item. For example, access to a content item by another user within 24 hours, an access frequency greater than 5 accesses in the last week, and accesses to sufficiently similar content items within the last 3 days may all be criteria predetermined to be predictive of an attempt to access a remote content item within the next 6 hours. Therefore, the retention score of a content item may increase by a predetermined magnitude for each of the criteria satisfied by the content item. The magnitude of the increase for a particular satisfied criterion may be proportional to the predictive strength of the particular criterion.

Figure 10:
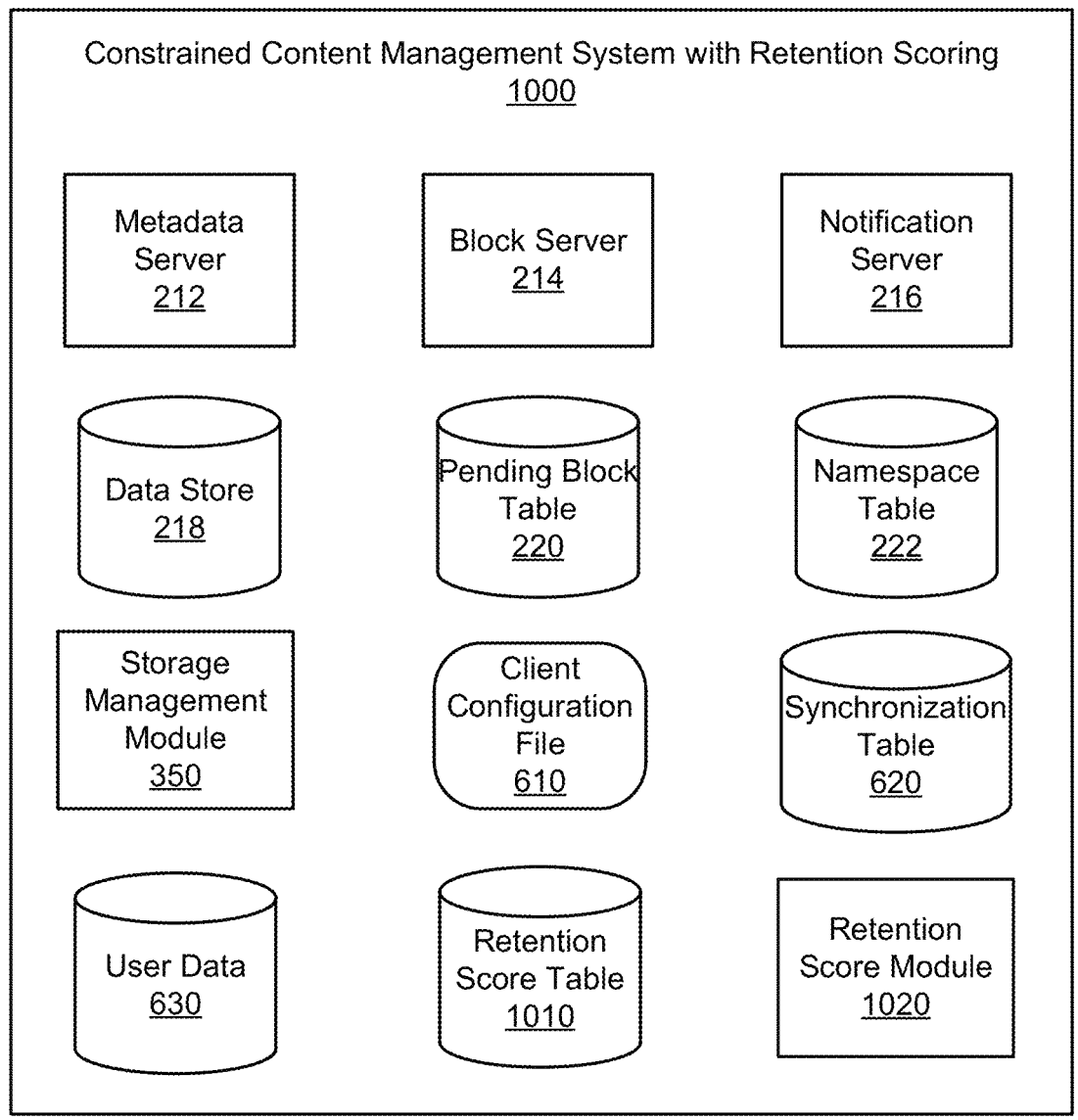
FIG. 10 illustrates a system environment for a content management system using predicted content item importance for constrained synchronization.

FIG. 10 illustrates a system environment for a content management system using predicted content item importance for constrained synchronization. Most of the modules of the constrained content management system 600 that are present in FIG. 10 perform similar or identical functions to those described with reference to FIG. 6 except where noted in the foregoing section. Therefore, the functions of all modules within content management system 1000 are not explained in detail in this section.

Content management system 1000 includes metadata server 212, block server 214, notification server 216, data store 218, pending block table 220, namespace table 222, storage management module 350, client configuration file 610, synchronization table 620, user data 630, retention score table 1010, and retention score module 1020. Client configuration file 610 and user data 630 have significant changes over previous versions described in FIG. 6. Client configuration file 610 is modified to include the retention score threshold for each shared content storage directory of each client device, while user data is modified to include user data relevant to the retention scoring method being used. The retention score module 1020 takes in user data 630 and data from the data store 218 to generate the retention score table 1010. The retention score table is a table enumerating the retention score of each content item managed by the content management system 1000. A separate retention score table may exist for each client device if normalization is being used to calculate retention scores. Whenever the retention score of a content item is updated, the retention score module 1020 consults the client configuration file 610 and the synchronization table 620 to determine if the corresponding content item to the recently changed retention score is remote on any client devices and if it exceeds any of the retention score thresholds of those client devices. If a retention score threshold is exceeded the retention score module requests that the storage management module 350 perform the necessary download and replacement of the representing shadow item.

Figure 11:
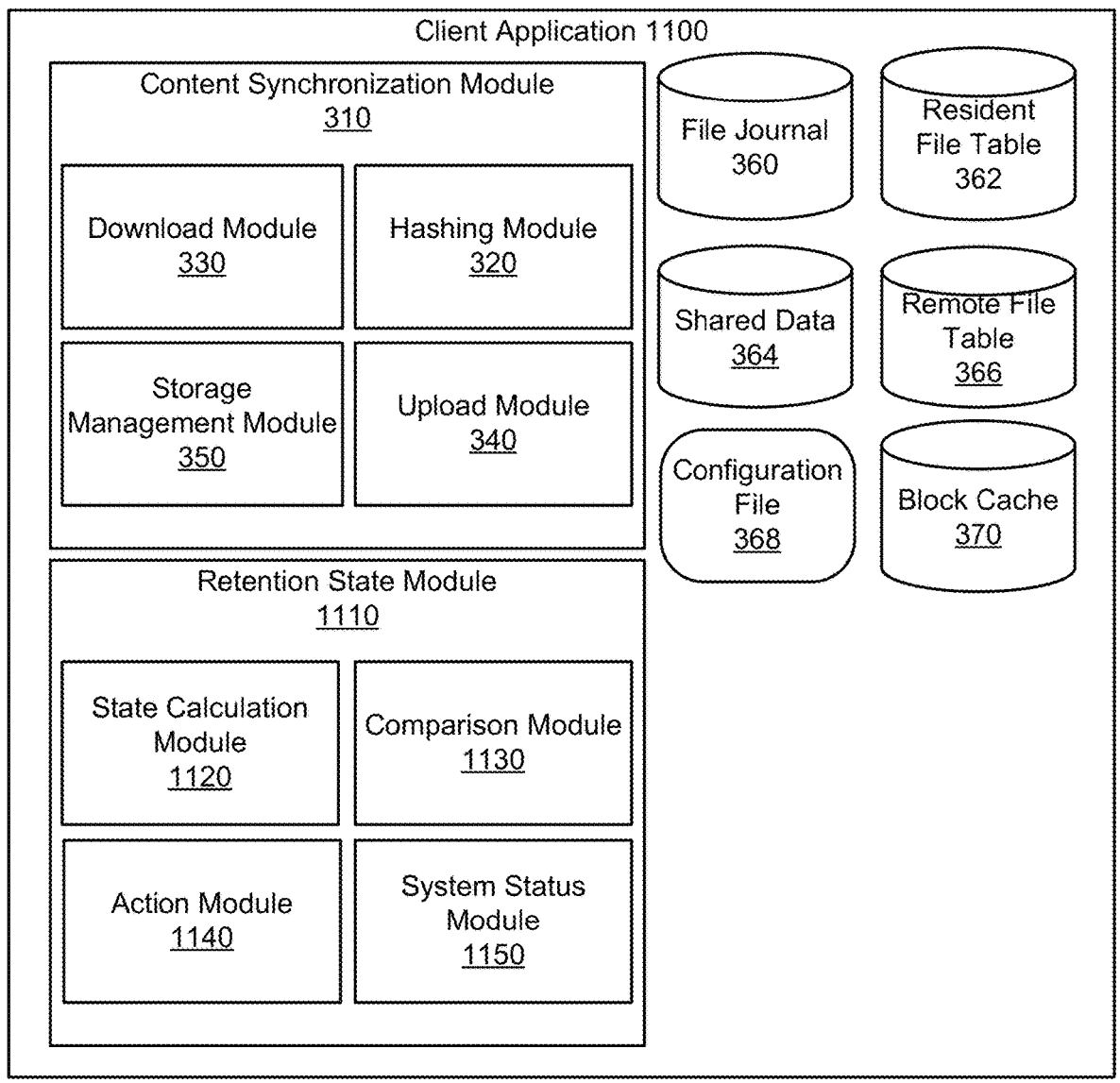
FIG. 11 illustrates a software architecture of a client device using idle state triggered content management.

FIG. 11 illustrates the software architecture of the client application 1100 for another embodiment of constrained synchronization. This embodiment conducts all downloading of remote content items, removal of unattended content items, and creation of shadow files while the client device is determined to be idle by the client application. This change in timing of the constrained synchronization process improves the client device by offering a functional improvement over the previously described embodiments while providing a similar increase in effective storage capacity. To perform these functions the idle state triggered embodiment modifies the system architecture illustrated in FIG. 3. In this embodiment, client application 1100 is comprised of content synchronization module 310, retention state module 1110, file journal 360, resident file table 362, shared data 364, remote file table 366, configuration file 368, and block cache 370. The content synchronization module 310 is further comprised of hashing module 320, download module 330, upload module 340, and storage management module 350. The retention state module 1110 is further comprised of state calculation module 1120, state comparison module 1130, action module 1140, and system status module 1150. Unless otherwise specified all previously mentioned modules and data tables have the same function as previously described slightly modified as one skilled in the art would recognize to accommodate the new modules. Any major modifications are explained below.

System status module 1150 uses storage kernel extension 382 to measure system activity on operating system 380. System activity can be measured using metrics for processor activity including but not limited to the number of non-idle processor cycles as a ratio of processor frequency or another CPU utilization metric (with or without adjustment for multiple processor cores), the number of threads, or the number of processes of a client device 100. Network activity metrics may also be used including network utilization, defined in bits per second or packets per second, as a ratio of the maximum speed for a particular port or connection. Additionally, memory usage metrics including the amount of available or free random access memory (RAM) may be used to measure system activity. The system status module 1150 may use the activity metrics mentioned above or any other suitable activity metrics, individually or in combination to measure overall system activity.

When the measure of system activity is below a predetermined activity threshold, the system status module 1150 reports to the retention score module 1110 that the client device is currently idle. This activity threshold may be defined as a percentage of the total computational resources of the client device, as defined by an activity metric, or the activity threshold may be defined as a particular value of an activity metric. For example, an activity threshold may be defined as the state of the client device 100 using less than 25% of available processing resources. Alternatively, the activity threshold may be defined as the state when the other processes of the client device 100 are, in total, using less than 2 GB of memory, or that there is at least 4 GB of total memory available on the client device.

When the client device 100 has been determined as being in an idle state by the system status module 1150, state calculation module 1120 determines the retention state of the shared content storage directory 120. Generally the retention state consists of the content items resident on the client device and a set of attributes corresponding to those content items. These attributes may include content item size, latest access time, access frequency, directory location, or any other suitable attribute that would be indicative of a content item's importance for retention on a client device. Additionally, the retention state could be represented by a set of statistics calculated using at least one of the attributes listed above.

Comparison module 1130 receives the retention state from the state calculation module 1120, it then compares the current retention state of the shared content storage directory 120 with a predetermined threshold retention state, defined in the configuration file 368, that may be specified by the user. The threshold retention state is a set of criteria pertaining to the attributes or calculated statistics of the client device included in the retention state. The comparison module 1130 determines whether the current retention state satisfies the criteria of the threshold retention state. If these criteria are violated (e.g. not satisfied), the comparison module 1130 reports the content items corresponding to the attributes, or the calculated statistics based on those attributes, that violate the threshold retention state criteria to the action module 1140.

Action module 1140 receives the report from the comparison module 1130. It then determines what actions will bring the retention state back to within the threshold retention state criteria. These actions may include removing content items from the shared content storage directory 120 and replacing them with shadow items, or replacing shadow items representing remote content items with the content items themselves. Once these actions have been determined, the action module 1140 requests that content synchronization module 310 complete the required actions.

Figure 12:
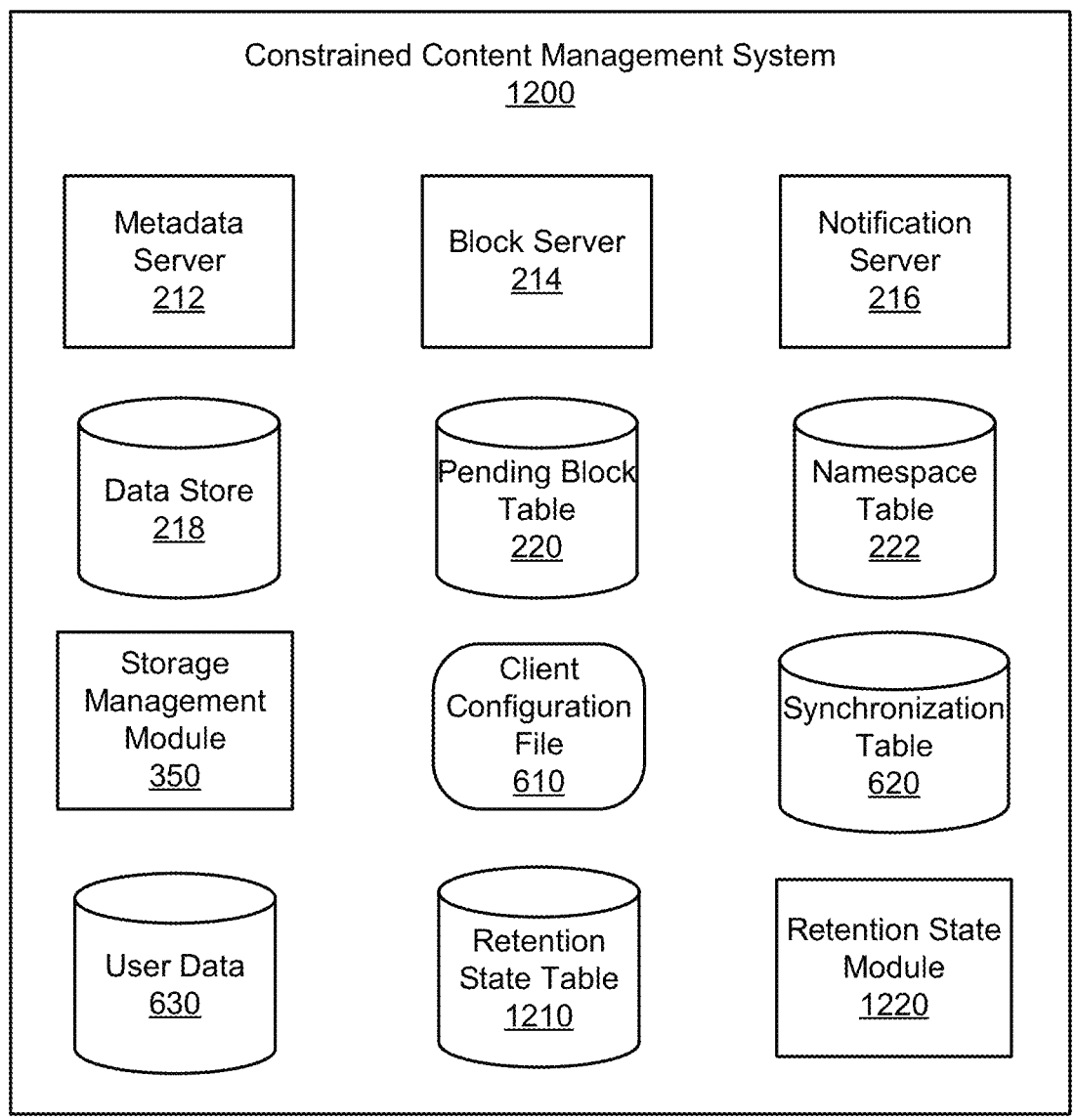
FIG. 12 illustrates a system environment for a content management system using idle state triggered content management.

Alternatively, idle state triggered constrained synchronization could be conducted by the content management system itself further reducing the computation burden on the client device and increasing device availability for other uses. FIG. 12 illustrates a system environment that completes this task. Constrained content management system 1200 is comprised of metadata server 212, block server 214, notification server 216, data store 218, pending block table 220, namespace table 222, storage management module 350, client configuration file 610, synchronization table 620, user data 630, retention state table 1210, retention state module 1220. Unless otherwise specified all previously mentioned modules and data tables have the same function as previously described slightly modified as one skilled in the art would recognize to accommodate the new modules. Any major modifications are explained below.

In this version of the embodiment, client application 200 on a client device connected to the content management system 1200 reports to the content management system 1200 on the status of the client device. When the client device is idle the content management system 1200 uses the retention state module 1220 to determine the retention state of the shared content storage directory 120 on the idle client device. The retention state module then updates the retention state table 1210, which contains the current retention state of all client devices connected to the content management system 1200. The retention state module 1220 then conducts steps similar to retention state module 1110 using potentially similar submodules, as described during the discussion of FIG. 11.

The retention state of a shared content storage directory can be determined using a variety of methods. Generally, the retention state is criteria based and is maintained periodically whenever the client application determines that the client device is idle. However, it is also possible to implement the retention state and threshold retention state numerically such that each state is represented by a statistic calculated using the attributes of the content items resident on the client device. If the retention state is criteria based, the threshold retention state is a set of criteria that the content items within the shared content storage directory must satisfy. Additionally, in the case of a criteria based retention state, the user may be given an option to choose the retention state criteria thereby allowing customization of the categories of content items resident on a client device 100.

The period used to check each client device 100 can be a predetermined value of the content management system, set by the user, or determined based on usage patterns of the particular client device. For example, if a user accesses content items on their client device 100 on average every 24 hours the period could be set to ensure that the shared content storage directory is maintained before 24 hours passes.

As an alternative to checking a shared content directory periodically, another embodiment could maintain a shared content directory only when the shared content directory satisfies a second set of criteria that indicate urgency, for example, nearing a hardware storage limit.

Storage Space Criteria: One possible set of criteria is to have a storage allocation criteria. For example, a storage allocation could be set at 20 GB but instead of behaving like the previous embodiments, the content management system would allow the content items stored on the shared content storage directory to exceed the criteria value (in this example 20 GB) until the device was idle. Then a similar process of determining unattended content items could be used to remove the appropriate content items and satisfy the storage space criteria for the shared content storage directory.

Access Time Criteria: A second criterion could be an access time criterion. For example, the criterion could state that no content item with a latest access time earlier than a predetermined time interval in the past can be resident within the shared content storage directory. These content items would be allowed to remain resident within the shared content storage directory until the client device 100 was idle.

At that point the retention state module would simply request the removal of all content items with a latest access time earlier than the predetermined time interval.

Content Item Size Criteria: Another set of criteria is the content item size criterion. For this method, a threshold on the individual content item's size is set. Therefore, whenever the client device 100 is idle any content item over or under that threshold is removed from residence on the client device 100.

Access Frequency Criteria: Finally an access frequency criterion is used to set a minimum number of accesses within a predetermined time interval required to remain resident on a client device 100. If a particular content item is not accessed frequently enough it is removed from the client device whenever it is idle.

Note that this list of retention criteria is not exhaustive. Additionally, these criteria may be used in conjunction with each other resulting in more complex rules.

Figure 13:
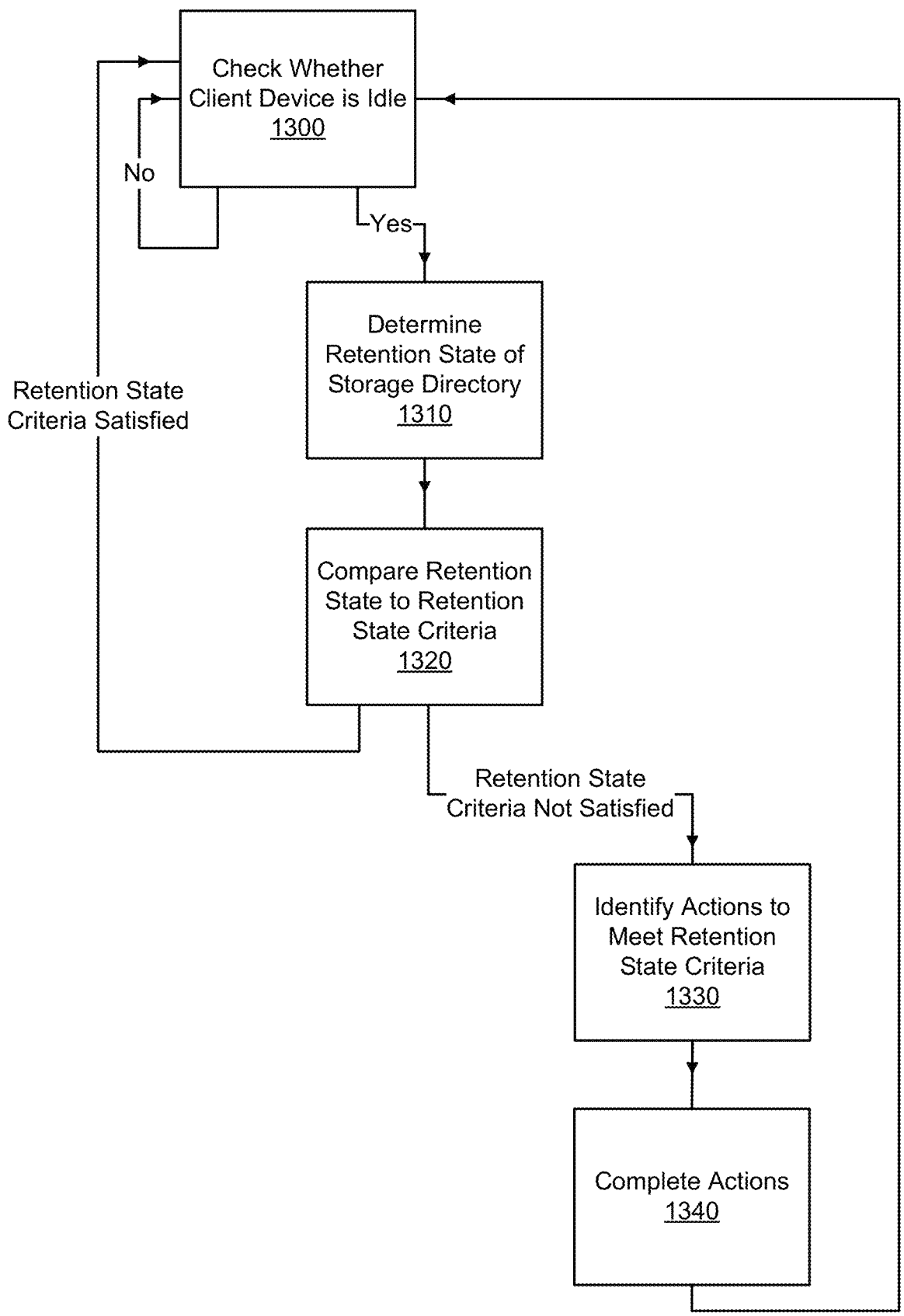
FIG. 13 is a flow diagram illustrating a process used in idle state triggered content management.

FIG. 13 is a flow diagram illustrating the function of idle state triggered constrained content management. First the system checks 1300 to determine whether a particular client device 100 is idle. This step is completed either periodically or in response to the content storage directory reaching a predetermined threshold. If the device is idle, the system determines 1310, the retention state of the client device. Then the system compares the current retention state of the shared content storage directory to the retention state criteria for the shared content storage directory. If the criteria are satisfied by the current retention state of the shared content storage directory the system resumes checking 1300 to determine whether the client device 100 is idle. If the retention state criteria are violated the system identifies 1330 actions to perform on the shared content storage directory 120 that are required for the shared content storage directory 120 to meet the retention state criteria. The system then performs 1340 those actions on the shared content storage directory 120 to conform to the predetermined retention state criteria.

Figure 14:
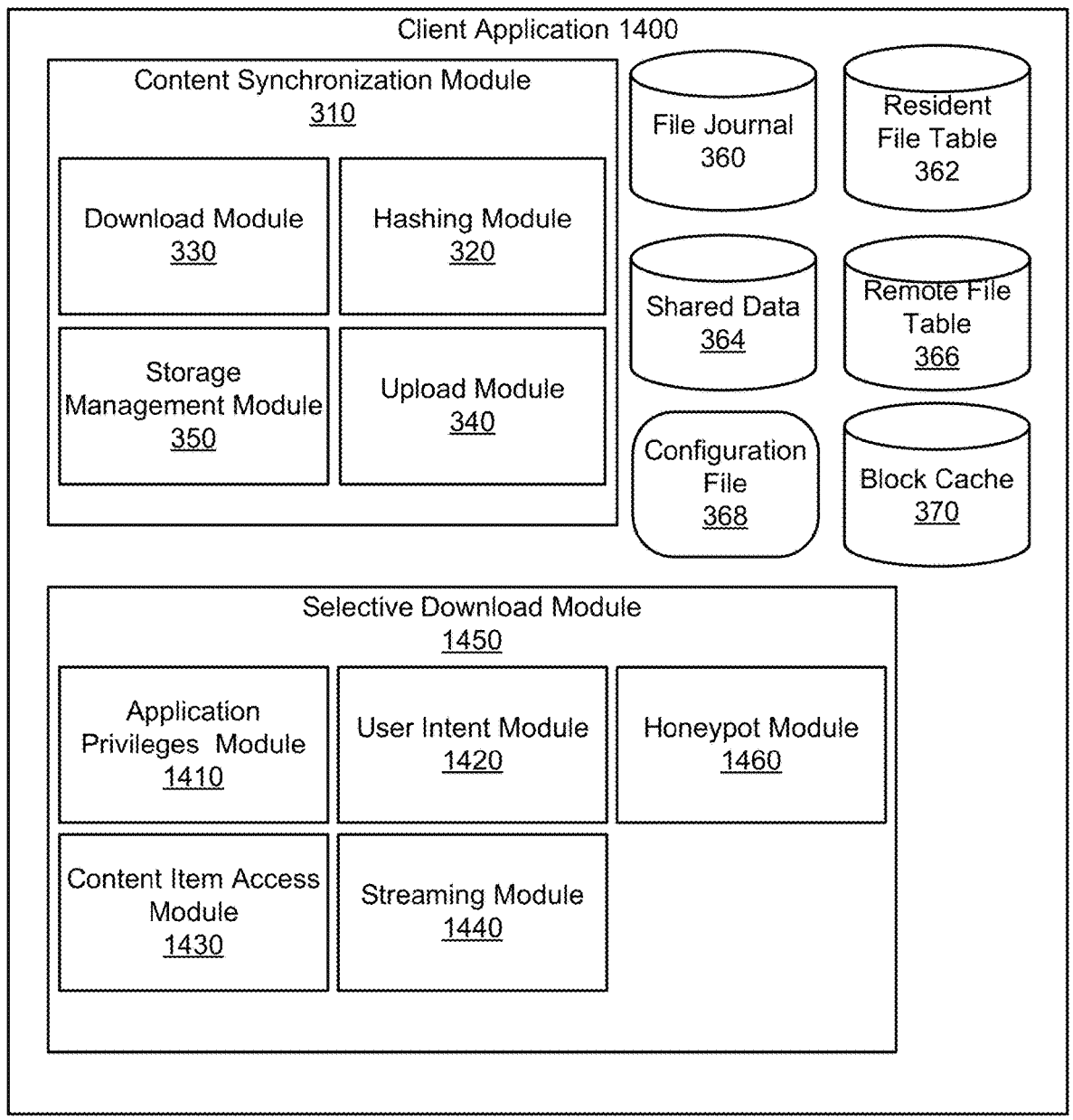
FIG. 14 illustrates a software architecture of a client device using selective downloading for a content management system utilizing constrained synchronization.

FIG. 14 illustrates the software architecture of a client application 1400 configured to selectively download content items corresponding to a shadow item on the client device 100. In this embodiment, when an application or process of an application on the client device requests access a shadow item in the shared content storage directory 120, the client application 1400 determines whether to download or stream the content item associated with the shadow item to the client device based on a number of qualifications. These qualifications may include whether the requesting application is on a list of approved applications, whether the time between the directory request and the content item request was within a time interval approximating human reaction time, whether the application request is associated with a user interface on the client device, or whether the user provided explicit authorization (for example using a pop up menu presented by the client application 1400) to download the content item. The client application 1400 may deny content item downloads if a requesting application or process do not meet the qualifications or, alternatively, the content item may be streamed to the client device providing access. By limiting the cases in which content items are downloaded to the client device, the client application 1400 prevents applications from causing unwanted downloading activity, thereby providing for improvements in reducing processor activity, network activity and power consumption while also keeping only the desired content items stored in the shared content storage directory. Reducing processor activity is beneficial because it enables the processor to be utilized for other more important tasks, and reduces power consumption; reducing network activity is beneficial to reduce bandwidth and data consumption; this is particularly beneficial for mobile devices in which excess data consumption results in both reduced network performance and increased costs and fees; reduced power consumption is beneficial especially for mobile devices as it prolongs battery life. For example, a photo gallery application may request to open a large number of photo files within a short period of time. Many of these photos may be represented as shadow items on the shared content storage directory, which, without selective downloading, would cause the client application to begin downloading a large amount of data. This would require much of the client device's network bandwidth and/or processing power and would result in a subpar user experience. If selective downloading were used in the above situation, the user could be, for example, prompted with a message asking whether client application 1400 should download all the photos requested by the photo gallery application. The user would then have the opportunity to prevent the downloading activity if it was unwanted. In an alternative example, the client application 200 could stream the previews of the photos in the photo gallery instead of downloading each of them from the content management system 110 and only perform a full download upon receiving a request to view a higher resolution version of a particular photograph. These are just a few examples of what could be implemented using a selective downloading system as described below.

The selective download embodiment is an addition to the system architecture illustrated in FIG. 3. In this embodiment, client application 1400 is comprised of content synchronization module 310, selective download module 1450, file journal 360, resident file table 362, shared data 364, remote file table 366, configuration file 368, and block cache 370. The content synchronization module 310 is further comprised of hashing module 320, download module 330, upload module 340, and storage management module 350. The selective download module 1450 is further comprised of an application privileges module 1410, a user intent module 1420, a content item access module 1430, a streaming module 1440, and a honeypot module 1460. Unless otherwise specified all previously mentioned modules and data tables have the same function as previously described, slightly modified as one skilled in the art would recognize to accommodate the new modules. Any major modifications are explained below.

The selective download module 1450 works in concert with the storage management module 350 to prevent unwanted downloads. Upon the storage management module 350 receiving a request from an application to access an item in the shared content storage directory 120, the storage management module 350 determines whether the requested item is a shadow item or a content item. Upon determining that the requested item is a shadow item, the storage management module 350 provides the application path, shadow item path, and process ID to the selective download module 1450 so that the selective download module 1450 can determine whether the content item can be downloaded from the content management system 110.

The application privileges module 1410 checks received application paths against a list of approved applications for the client device to determine whether the identified application is an approved application, and is one means for performing this function. The list of approved applications may be stored in local memory of the client device or in the content management system 110, and may be modifiable by the user through user interface prompts generated upon receiving requests from uncategorized applications, or through user settings. In some embodiments, the lists maintained by the application privileges module 1410 may be preselected by administrators of the content management system 110 and further modifiable by the user. In addition to a list of approved applications, the application privileges module 1410 may maintain a list of restricted applications (i.e. applications that are not permitted to trigger content item downloads), a list of streaming applications (i.e. applications for which the requested item can be streamed from the content management system 110, or a list of partial access applications (i.e. applications for which portions of a content item may be downloaded). The application privileges module 1410 may have any number of the aforementioned lists or additional lists with different levels of access to the remote content item. Each of the aforementioned lists may be stored in the configuration file 368 or in another suitable location. In some cases, the lists may restrict or approve applications on a per process basis instead of restricting or approving a whole application. If this is the case, the process name is used instead of the application path of the requesting application.

The application privileges module 1410 contains program logic for an algorithm that tests the application path against each of the lists, as follows. If the application path received by the application privileges module 1410 matches an application in the approved application list, the application privileges module 1410 notifies the storage management module 350 that the requested content item may be downloaded from the content management system 110. If the received application path matches an application in the restricted application list, the download is denied and the client application 1400 may notify the user of the denial with a pop up message or any other suitable notification. If the received application path matches an application in the streaming application list, the application privileges module 1410 may notify the streaming module 1440 to initiate a stream with the content management system 110. In some embodiments before notifying the stream module 1440 the application privileges module may first notify the content item access module 1430, which determines whether the content item should be streamed or downloaded to the client device.

If the received application path matches an application in the partial applications list the application privileges module 1410 may authorize the content management module 350 to perform a partial download of the requested content item. In the case of a partial download, the storage management module 350 may download the block containing the requested portion of the content item or download a portion smaller than the block size. The block cache 370 may not include the partial block or single block as a block in the resident block list in order to prevent the creation of a composite item with mixed versions.

In some embodiments, the application privileges module 1410 does not have a separate list for applications with download privileges and a list for applications with streaming privileges. Instead, there is a single list for approved applications and the content item access module 1430 determines whether downloading the content item or streaming the content item is preferable.

In the case that the requesting application is not included in one of the lists maintained by the application privileges module 1410, the selective download module 1450 may attempt to determine user intent by utilizing the user intent module 1420 (i.e. whether the user intends to access the application or whether the application is performing the request as part of an automated or auxiliary function).

In another embodiment, when the requesting application has not been categorized or found in one of the foregoing lists, the application privileges module 1410 may provide the user the opportunity to categorize the application by displaying a user interface window with categorization options.

The user intent module 1420 tests to determine whether the user intended for the requesting application to request the shadow item, and is one means for performing this function. The final determination of user intent may be based on a positive result for all of the tests used by the user intent module 1420 or may be based on a weighted average or other calculation based on the results of the tests. In one embodiment, the user intent module 1420 contains program logic for an algorithm including tests that may be used individually or collectively to determine user intent.

Reaction Time: The user intent module 1420 may determine user intent by measuring the time difference between a directory open request and file open request from the requesting application. This time maybe be measured by the storage kernel extension 384 monitoring the file system 382 and communicated to the user intent module 1420. Upon receiving the measured time between a directory open request and a file open request, the user intent module 1420 may compare the measured time difference to a time interval approximating average human reaction time (e.g. 250 milliseconds to 1 second). If the time difference is less than average human reaction time the user may not have intended the make the request, in which case it is appropriate to not download the shadow item.

Associated UI Window: The user intent module 1420 may examine the current process of the application to determine whether it has a current window open on the client device 100. If there is a current window it suggests that the user may be aware of the application's attempt to access the content item. If there is no window associated with the application's current process then it is unlikely that the user is aware of the application's request. The storage kernel extension 384 may monitor the application x and determine the associated window.

Application Path: The user intent module 1420 may determine the location of the application in the file system 382 of the client device to estimate the likelihood that the application is a user facing application. For example, if the application is located in the "applications" folder as opposed to a hidden folder or directory it is more likely that the application is user facing and therefore is operating under the direction of the user.

User Activity: The user intent module 1420 may monitor user activity such as the amount of mouse movement, actions per minute of the user (including keystrokes, touches to a touchscreen, etc.) or any other indicator that the user is active on the client device. If the user is active at the time when the application request occurs it is more likely for the user to have knowledge of the application request. User activity can be monitored by calling operating system programming interfaces to obtain activity states.

Explicit Indications of User Intent: The user intent module 1420 may, upon receiving a request from an application or process, display a message to the user allowing them to indicate whether they approve of the download. The user may be prompted with a yes or no question or the user intent module 1420 may present options for the user to categorize the requesting application into one of the lists maintained by the application privileges module 1410.

Upon using some or all of the above methods of determining user intent, the user intent module 1420 notifies the storage management module 350 whether to grant the request of the requesting application. Alternatively the user intent module may notify the content item access module 1430 that the request for the content item should be granted.

In some embodiments, the content item access module 1430 determines whether the requested content item is suitable to download or stream to the client device 100 given access to the content item has been granted by either the application privileges module 1410 or the user intent module 1420. The content item access module 1430 uses attributes of the content item and the requesting application as well as current network metrics to determine whether it is optimal to stream the content item to the client device or download it. In some embodiments, the content item access module 1430 is configured to choose an option that requires the least noticeable interruption to standard user experience. For example, if the file is too large to download within a reasonable amount of time the content item access module 1430 may determine that it is more efficient to stream the content item. The content item access module 1430 accomplishes this by using a set of criteria to determine the suitability of either the downloading or the streaming option. In some embodiments, the content item access module 1430 may calculate the time required to download the content item and compare it to the time to initiate a streaming session. The content item access module 1430 may have criteria for a maximum download size for a content item, a minimum streaming size for a content item, a minimum network bandwidth for streaming, a maximum network latency for streaming or any other suitable criteria.

In some embodiments, the content item access module 1430 may determine whether to use the downloading or the streaming option based on the type of application making the request. For example, word processing applications may be inefficient to stream and so downloading may be favored for applications of that type. As another example, video applications may tend to request larger files and so streaming may be favored. Likewise the content item access module 1430 may use the content item type as an additional factor in the decision. For example, content item's with certain file extensions may be more streaming favored or download favored.

If the content item access module 1430 determines that a requested content item should be streamed to the client device the content item access module 1430 notifies the streaming module 1440 to initiate a stream between the content management system 110, where the content item is stored, and the client device. If the content item access module 1430 determines that the content item should be downloaded, the content item access module 1430 notifies the storage management module 350 to set up a download with the content management system 110.

The streaming module 1440 may initiate a stream between the content management system 110 and the client device 100. Memory mapping may be used to stream the content item. When memory mapping is used the content item may be downloaded directly to virtual memory. Upon receiving the content item in virtual memory, the streaming module 1440 may periodically synchronize the copy of the content item temporarily stored in virtual memory with the content management system 110.

In some embodiments, honeypot module 1460 may create hidden content items, which are referred to as honeypots, in the file system of the client device 100 and that mimic the properties of actual content items. Because the honeypots are hidden to the user of the client device 100 (by using a hidden directory in the file system of client device 100), any process that requests access to a honeypot is likely to be an automated process. Thus, by monitoring processes accessing the honeypots, the honeypot module 1460 is more easily able to identify processes that are automated and not initiated by a user of the client device 100.

Honeypots are created by the honeypot module 1460 inside a hidden internal directory associated with the client application 1400. Depending on the embodiment, multiple honeypots may be created having properties of different types of content items. For example, a honeypot may be created to mimic a rich text file, a video file, music file, or any other desired file format. Additionally, honeypots may be created with different permissions, owners, or other typical file properties. Also depending on the embodiment, a honeypot may contain only metadata without any content data (in order to mimic shadow items in the shared content storage directory 120). In some cases, the honeypot module 1460 may create honeypots that represent each file type that is included in the content storage directory 120. Additionally, the honeypot module 1460 may create honeypots that exhibit varying behavior upon receiving an access request. The honeypot module 1460 may create honeypots that behave like they have been accessed by an application on the approved application list, the restricted application list, or even the streaming application list. This provides further benefits in determining whether the behavior of an automated process is acceptable.

Once the honeypot module 1460 has created a set of honeypots in a hidden internal directory, the honeypot module 1460 monitors the processes that access the honeypots and may calculate a plurality of access metrics for each identified process. Accesses to honeypots are tracked in the same way as accesses to any other content item in the shared content storage directory 120 by using the storage kernel extension 384. The process name, process ID, and application path of the process that requested access to a honeypot are recorded and are given a timestamp according to the time of the access request. The honeypot module 1460 then reports the access record to the content management system 110 for further processing. In addition to the information about the process accessing the honeypot, the access record also includes an identifier of the honeypot that was requested.

The content management system 110 maintains a list of process names that have been recorded as issuing access requests for honeypots or other content items stored on client devices. For each listed process, the content management system 110 may calculate and maintain a plurality of access metrics characterizing the behavior of the process. Upon receiving a record of a process requesting access to a honeypot, the content management system 100 compares the process name of the access record with the maintained list of process names from previous access records. If the newly recorded process name matches one of the process names in the list of process names the content management system 110 may recalculate the access metrics associated with the process name based on the new access record. If the newly recorded process name is not present in the maintained list of process names, the content management system 110 adds the process name to the list and begins to calculate access metrics for the new process based on the current access record and any future access records with the same associated process name.

Access metrics for a process may by categorical or quantitative depending on the metric. Access metrics for a process may include but are not limited to the following:

Honeypot access: This access metric is a binary value indicating whether a process has accessed a particular honeypot on a client device at any point in time. Depending on the embodiment, there may be a single honeypot access value or a value for each type of honeypot stored on client devices synchronized with the content management system 110. For example, if there is a separate honeypot for audio and visual files there may be a honeypot access value for each of those honeypots. Depending on the honeypot identifier in the access report the honeypot access metric may provide categorical information that characterizes the behavior of the requesting process.

Access delay time: This access metric may be calculated if a process is reported accessing multiple honeypots in succession, or if the process accesses another content item in the shared content storage directory 120 on the same client device 100. The access delay time for the process is the minimum time difference between two accesses on the client device. A lower access delay time may be indicative of a more undesirable process since the process could trigger downloading for a large number of shadow items in a short period of time.

Access frequency: This access metric is similar to the delay time, however, instead of simply being calculated as the minimum time difference between two access requests issued by the same process, it is the average frequency of the requests issued by the process over the duration of the process. This provides similar information to the access delay time regarding the potential for the process to request access to a large number of shadow items.

Directory open delay: This access metric indicates the difference in time between when the process opens the hidden directory containing the honeypots and when a request is made to view the honeypot. This access provides yet another check to determine whether the process is automated.

Retry behavior: A variety of access metrics may be calculated that pertain to the retry behavior of a particular process when multiple access requests are received for the same honeypot. An access metric may indicate the time-out time of the process. In addition, a categorical access metric may indicate whether a process retries to access the honeypot and if so whether a time-out time is used or if a certain number of retries are made.

In some embodiments, an administrator of the content management system 110 uses the access metric data to categorize processes that have requested to access the honeypots. In other embodiments, the content management system 110 uses a process listing model to automatically assign a process, and in some cases the associated application, to an approved, restricted, streaming, or partial privilege list. The process listing model may utilize thresholds for each of the access metrics and assign a process to a list based on the thresholds. Alternatively, a weighted scoring system may be used to provide each process with a score based on the access metrics. Then a number of score thresholds could be used to sort the processes into lists. In another embodiment, a supervised learning model is trained based on the access metrics of applications or processes that have already been categorized. Once the model has been trained, whenever access data is received for a new process it may be evaluated and sorted using the model.

Figure 15:
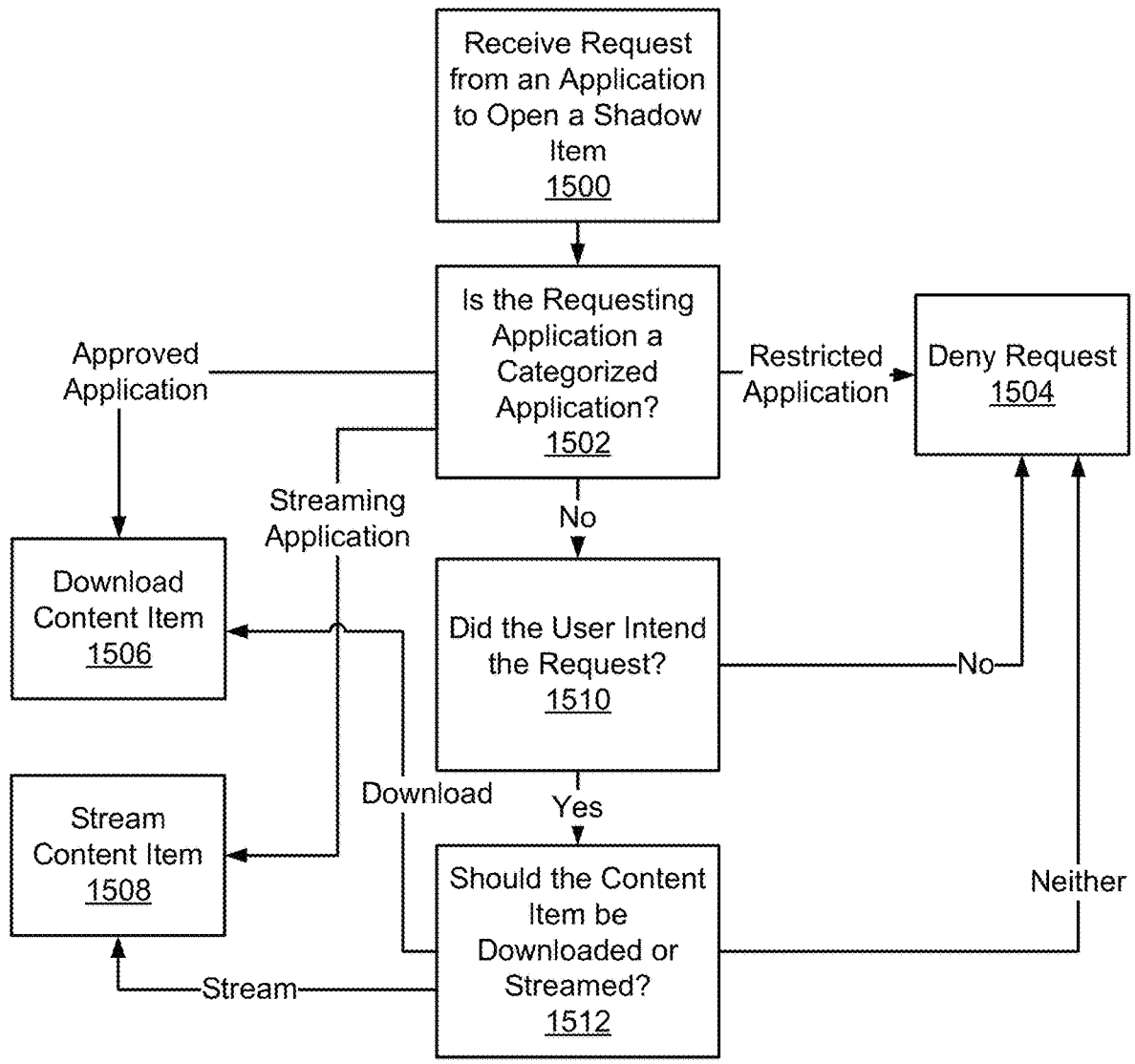
FIG. 15 is a flow diagram illustrating an example process used to approve content items for download if the corresponding shadow item is requested.

FIG. 15 is a flow diagram illustrating an example algorithm to approve content items for download if the corresponding shadow item is requested in accordance with some embodiments. Those of skill in the art will appreciate that the modules described above may be utilized to perform different functions to those illustrated in FIG. 15.

Upon receiving a request from an application to open a shadow item 1500 the applications privileges module 1410 determines if the requesting application is categorized in one of the maintained lists of applications. If the requesting application is in a list of approved applications, the content item is downloaded 1506 from the content management system 110. If the application is included in the list of streaming applications, the content item is streamed 1508 to the client device 100. If the application is included in a list of restricted applications, the request to open the content item is denied 1504.

If the requesting application is uncategorized the application privileges module notifies the user intent module 1420. The user intent module 1420 uses a variety of tests to ascertain whether the user intended to request the content item 1510, as described above. If the user intent module 1420 determines that the user did not intend to request the content item, the request is denied 1504. If the user intent module 1420 determines that the user intended to request the content item the user intent module notifies the content item access module 1430.

The content item access module 1430 determines 1512 whether the content item should be downloaded or streamed based on attributes of the content item, the application, and current network metrics. If the content item access module 1430 determines that the requested content item should be downloaded the content item is downloaded 1506. If the content item access module determines that the content item should be streamed the content item is streamed 1506 to the client device.

Figure 16:
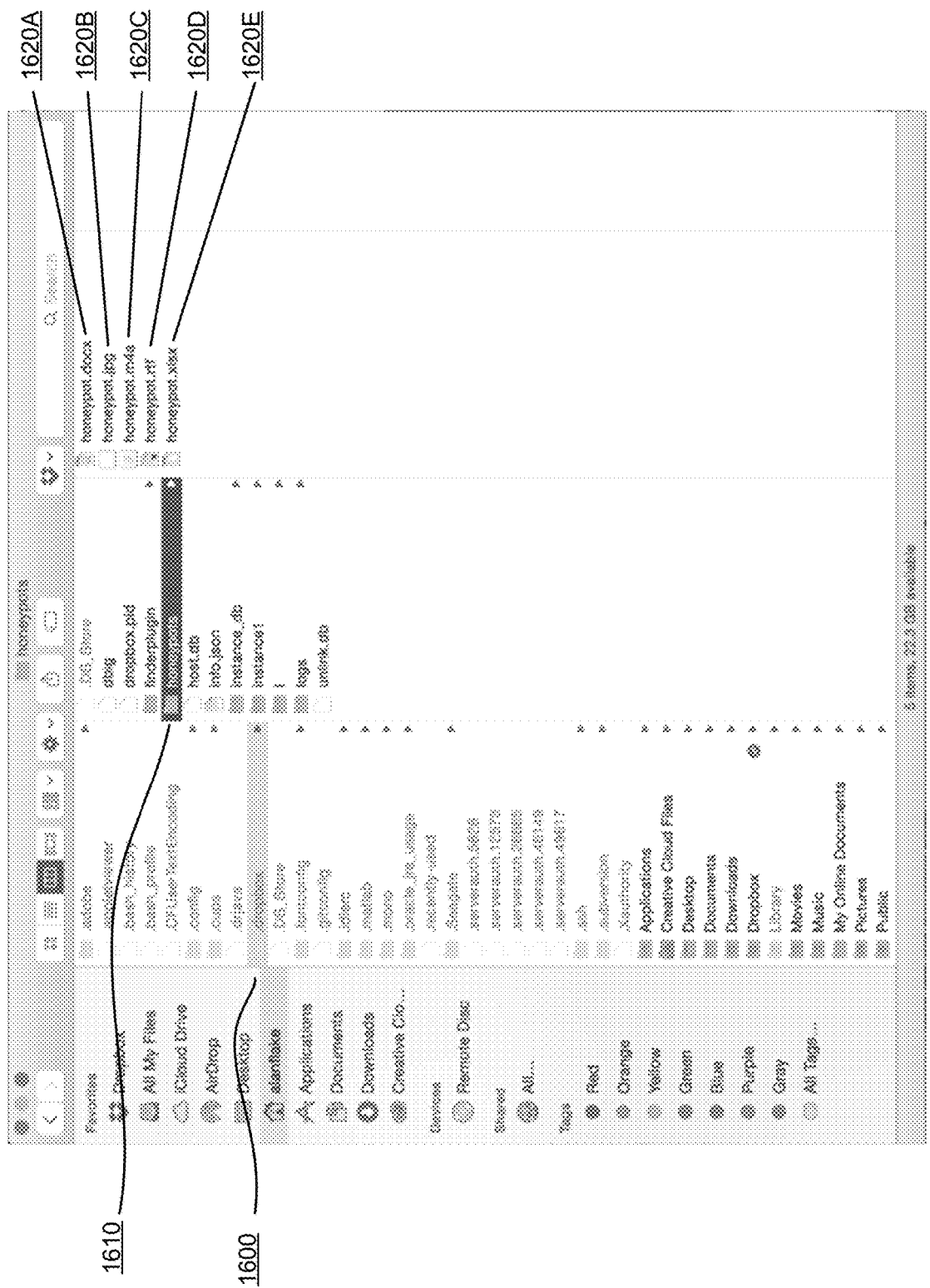
FIG. 16 illustrates a number of hidden honeypot files in one embodiment of selective downloading for a content management system.

FIG. 16 illustrates a file system having a number of hidden honeypot files in one embodiment of selective downloading for a content management system. Icon 1600 indicates the hidden directory associated with the client application 1400. Icon 1610 indicates the hidden internal directory that stores the honeypots. Icons 1620A-1620E indicate a number of honeypots that are representative of the content items in the shared content storage directory. Icon 1620A is a honeypot representing a Microsoft Word file, Icon 1620B is a honeypot representing a JPEG image file, Icon 1620C is a honeypot representing an audio/video file, Icon 1620D is a honeypot representing a rich text file, and Icon 1620E is a honeypot representing a Microsoft Excel file. These honeypots 1620 are just an example of honeypots that may be stored on a client device 100.

Figure 17:
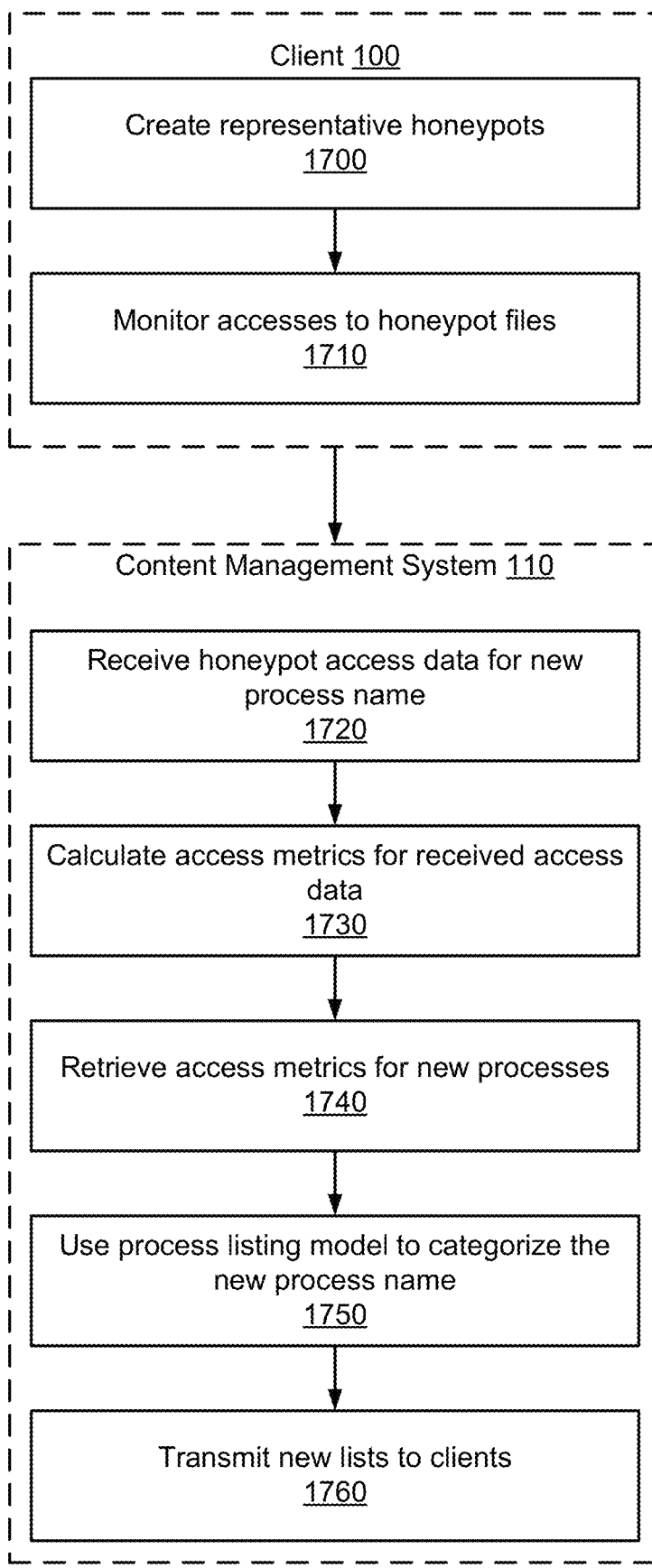
FIG. 17 is a flow diagram illustrating a process for categorizing application processes using honeypot access data.

FIG. 17 is a flow diagram illustrating a process for categorizing application processes using honeypot access data. First client device 100 creates 1700 representative honeypots as files in a hidden internal directory. The honeypots may be standardized across client devices or may mimic the content items that are present in the shared content storage directory 120. Once the honeypots have been created on the client device 100, the honeypot module 1460 uses kernel extension 384 to monitor processes that request access to the honeypots. As access data is collected on the client device 100 and then reported to the content management system 110. Content management system 110 receives 1720 the honeypot access data and determines that the process name associated with the reported access data is new by comparing to a list of known processes. The content management system 110 then calculates 1730 access metrics for the new process and any other processes included in the access data. The content management system 110 may retrieve 1740 the newly calculated access metrics for the new process name for use in a process listing model. The content management system 110 uses 1750 the retrieved access metrics as input to the process listing model to categorize the new process name into one of the application privileges lists (or a process privilege list). Once the process listing model has determined the privilege level of the new process the new lists are sent 1760 to client devices 100.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a content management system from a client device, access data including at least a process name and a timestamp of a process requesting access to a honeypot of one or more honeypots on the client device, wherein each of the one or more honeypots corresponds to a respective file located in a hidden directory on the client device and has metadata indicating a particular file type;
responsive to receiving the access data indicative of the process requesting access to the honeypot on the client device, comparing, by the content management system, the process name to a list of known process names corresponding to processes monitored by the content management system that have run on the client device;
responsive to determining that the process name is not included in the list of known process names:
adding the process name to the list of known process names;
maintaining one or more access metrics for the process name based upon the received access data indicative of the process requesting access to the honeypot; and
adding the process name into a list of restricted processes responsive to the maintained access metrics for the process name satisfying one or more thresholds according to a process listing model; and
sending the list of restricted processes to the client device.

2. The method of claim 1, wherein the access data also includes an identifier of the honeypot to which the process requested access.

3. The method of claim 1, wherein the one or more honeypots are a plurality of honeypots are located on the client device in the hidden directory, each of the plurality of honeypots having metadata indicating a separate file type.

4. The method of claim 3, wherein access data further includes a honeypot identifier, the honeypot identifier indicating the honeypot of the plurality of honeypots located on the client device that received an access request from the process.

5. The method of claim 4, wherein access data further includes a plurality of access records, each access record indicating at least a honeypot identifier identifying a honeypot that received an access request, the process name of the requesting process, and a timestamp of the requesting process.

6. The method of claim 3, wherein the plurality of honeypots have metadata representing file attributes of content items stored on the client device.

7. The method of claim 3, wherein the plurality of honeypots have metadata representing a variety of file properties.

8. The method of claim 1, wherein the one or more access metrics includes at least one of:
a binary value indicating an access to a particular honeypot of the one or more honeypots,
an access delay time,
an access frequency,
a directory open delay, or
a categorical value indicating retry behavior.

9. The method of claim 1, wherein adding the process name into a list of restricted process further comprises categorizing the process name into one of:
a list of approved processes,
a list of restricted processes,
a list of streaming processes, and
a list of partial access processes.

10. The method of claim 1, wherein the process listing model is a supervised learning model trained on previously collected access data and process categorizations.

11. A computer implemented method comprising:
creating on a client device one or more honeypot files in a hidden directory on the client device, each of the one or more honeypots file having metadata indicating a particular file type;
responsive to receiving access data for a process executing on the client device, the access data including a process name and a timestamp indicating a time that the process requested access to a honeypot file of the one or more honeypot files on the client device, providing the access data by the client device to a content management system;
receiving by the client device from the content management system an indication of whether the process is a restricted process, based on one or more access metrics for the process calculated by the content management system based upon the provided access data for the process indicative of the process requesting access to the honeypot file, wherein the indication indicates that the process is a restricted process responsive to the maintained access metrics for the process satisfying one or more thresholds according to a process listing model maintained by the content management system;
receiving by the client device a request from the process to access a shadow item stored in a shared content directory on the client device, the shadow item corresponding to a content item stored on the content management system, wherein the shadow item contains metadata representing the content item without the content data of the represented content item;
determining whether the process is a restricted process based on the indication from the content management system;
responsive to the process being a restricted process, denying the process access to the content item in the content management system corresponding to the shadow item; and
responsive to the process not being a restricted process, replacing by the client device the shadow item in the shared content directory on the client device with the content item from the content management system corresponding to the shadow item.

12. A computer-implemented method comprising:
maintaining in a memory of a client device a list of a plurality of restricted processes on the client device;
creating on one or more honeypot files in a hidden directory on the client device, each of the one or more honeypots file having metadata indicating a particular file type;
responsive to receiving access data for a selected process executing on the client device, the access data including a process name and a timestamp indicating a time that the process requested access to a honeypot file of the one or more honeypot files on the client device, providing the access data by the client device to a content management system;
receiving by the client device from the content management system an updated list of restricted processes, the updated list including the selected process, the selected process included in the updated list of restricted processed based on one or more access metrics for the process calculated by the content management system based upon the provided access data for the selected process indicative of the process requesting access to the honeypot file, wherein the selected process was added to the updated list responsive to the one or more access metrics satisfying one or more thresholds according to a process listing model maintained by the content management system;
receiving by the client device a request from the selected process to access a shadow item stored in a shared content directory on the client device, the shadow item corresponding to a content item stored on the content management system, wherein the shadow item contains metadata representing the content item without the content data of the represented content item;
determining by the client device that selected process is included in the updated list of restricted processes; and
responsive to determining that the selected process is included in the updated list of restricted processes, denying selected process access to the content item corresponding to the shadow item.

13. The method of claim 1, further comprising adding a requesting application associated with the process name into a list of restricted applications based on the maintained access metrics according to the process listing model.

14. The method of claim 11, wherein the access data also includes an identifier of the honeypot to which the process requested access.

15. The method of claim 11, wherein the one or more honeypots are a plurality of honeypots are located on the client device in the hidden directory, each of the plurality of honeypots having metadata indicating a separate file type.

16. The method of claim 11, wherein the one or more honeypots have metadata representing file attributes of content items stored on the client device.

17. The method of claim 12, The method of claim 11, wherein the access data also includes an identifier of the honeypot to which the process requested access.

18. The method of claim 12, wherein the one or more honeypots are a plurality of honeypots are located on the client device in the hidden directory, each of the plurality of honeypots having metadata indicating a separate file type.

19. The method of claim 12, wherein the one or more honeypots have metadata representing file attributes of content items stored on the client device.

* * * * *

UNITED STATES PATENT AND TRADEMARK OFFICE
CERTIFICATE OF CORRECTION

PATENT NO. : 10,831,715 B2
APPLICATION NO. : 15/396060
DATED : November 10, 2020
INVENTOR(S) : Benjamin Zeis Newhouse Page 1 of 1

It is certified that error appears in the above-identified patent and that said Letters Patent is hereby corrected as shown below:

In the Claims

Column 36, Line 57, Claim 3, delete "honeypots are located" and insert --honeypots located--.
Column 37, Line 19, Claim 9, delete "restricted process further" and insert --restricted processes further--.
Column 37, Line 31, Claim 11, delete "honeypots file" and insert --honeypot files--.
Column 38, Line 8, Claim 12, delete "honeypots file" and insert --honeypot files--.
Column 38, Lines 20-21, Claim 12, delete "restricted processed based" and insert --restricted processes based--.
Column 38, Line 61, Claim 18, delete "honeypots are located" and insert --honeypots located--.

Signed and Sealed this
Twenty-ninth Day of December, 2020

Andrei Iancu
*Director of the United States Patent and Trademark Office*